(12) United States Patent
Gu et al.

(10) Patent No.: US 10,979,546 B2
(45) Date of Patent: Apr. 13, 2021

(54) TERMINAL, DISPLAY PANEL, IMAGE ACQUISITION MODULE AND DISPLAY CONTROL METHOD

(71) Applicant: BEIJING XIAOMI MOBILE SOFTWARE CO., LTD., Beijing (CN)

(72) Inventors: Jianglin Gu, Beijing (CN); Chiafu Yen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/558,540

(22) Filed: Sep. 3, 2019

(65) Prior Publication Data

US 2020/0244787 A1    Jul. 30, 2020

(30) Foreign Application Priority Data

Jan. 29, 2019   (CN) .......................... 201910087475.1

(51) Int. Cl.
| | | |
|---|---|---|
| H04M 1/02 | (2006.01) | |
| H04N 5/225 | (2006.01) | |
| G03B 15/03 | (2021.01) | |
| G02F 1/133 | (2006.01) | |
| G09G 3/34 | (2006.01) | |
| G09G 3/36 | (2006.01) | |
| G02F 1/1335 | (2006.01) | |

(52) U.S. Cl.
CPC ...... *H04M 1/0266* (2013.01); *G02F 1/13306* (2013.01); *G02F 1/133512* (2013.01); *G03B 15/03* (2013.01); *G09G 3/3406* (2013.01); *G09G 3/36* (2013.01); *H04N 5/2257* (2013.01); *G02F 2201/56* (2013.01)

(58) Field of Classification Search
CPC .... G09G 3/3406; G09G 3/36; G02F 1/13306; G02F 1/133512; G02F 2201/56; H04M 1/0266; H04N 5/2257; G03B 15/03
See application file for complete search history.

(56) References Cited

U.S. PATENT DOCUMENTS

| | | | | |
|---|---|---|---|---|
| 2006/0028442 | A1* | 2/2006 | Bynum | ................. G06F 3/0421 345/157 |
| 2016/0330403 | A1* | 11/2016 | Siminoff | ............... H04N 5/2257 |
| 2018/0129798 | A1* | 5/2018 | He | ........................... G06F 3/042 |

(Continued)

FOREIGN PATENT DOCUMENTS

| | | |
|---|---|---|
| CN | 108469704 A | 8/2018 |
| CN | 109001934 A | 12/2018 |

OTHER PUBLICATIONS

Extended European Search Report dated Feb. 20, 2020 in EP19203721.6.

*Primary Examiner* — Ryan A Lubit

(74) *Attorney, Agent, or Firm* — Syncoda LLC; Feng Ma

(57) ABSTRACT

A terminal includes: an image acquisition module, a display panel, a light-emitting element, and a light converging member. An image acquisition module includes a lens. A light transmitting hole corresponding to the lens is formed in the display panel. The light-emitting element and the light converging member are arranged at the light transmitting hole. The light converging member is arranged on a side of the light-emitting element from which light is emitted, and is used for converging the light emitted by the light-emitting element over the lens.

20 Claims, 16 Drawing Sheets

(56) References Cited

U.S. PATENT DOCUMENTS

2019/0026527 A1\* 1/2019 He ............... G02B 6/0026
2019/0331960 A1\* 10/2019 Li ............... G02F 1/13318
2020/0050829 A1\* 2/2020 Akcasu ............ G06F 3/0412
2020/0117034 A1\* 4/2020 Yin ............... G02F 1/1339

\* cited by examiner

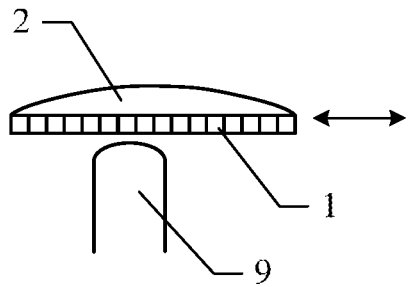
FIG. 25
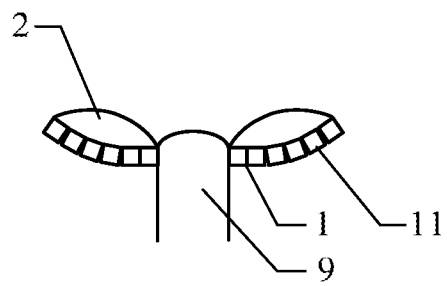
FIG. 26
| The light emitting element array emits light, and the light is converged at a position corresponding to the lens on the display panel after passing through the light converging member, so as to realize a display operation | ~ S1 |
|---|---|
| the image acquisition module acquires an image through the light transmitting hole, to realize an image acquisition operation | ~ S2 |
FIG. 27

TERMINAL, DISPLAY PANEL, IMAGE ACQUISITION MODULE AND DISPLAY CONTROL METHOD

CROSS-REFERENCE TO RELATED APPLICATION

This application claims priority to Chinese Patent Application No. 201910087475.1, filed on Jan. 29, 2019, the disclosure of which is incorporated herein by reference in its entirety.

BACKGROUND

To pursue better display effects and improved appearance of mobile phones, full-screen mobile phones are becoming popular.

SUMMARY

The present disclosure relates to the field of terminal technologies, and in particular, to a terminal, a display panel, an image acquisition module, and a display control method.

Various embodiments of the present disclosure provide a terminal, a display panel, an image acquisition module and a display control method.

According to a first aspect of the present disclosure, there is provided a terminal, including:

an image acquisition module including a lens;

a display panel, wherein a light transmitting hole corresponding to the lens is formed inside the display panel; and a light-emitting element and a light converging member arranged at the light transmitting hole, wherein the light converging member is arranged at a side of the light-emitting element from which light is emitted, and is used for converging the light emitted by the light-emitting element on the lens.

In some embodiments, the light converging member is disposed within the light transmitting hole, and is connected to a sidewall of the light transmitting hole.

In some embodiments, the light converging member is disposed over the light-emitting element.

In some embodiments, the light-emitting element is disposed within the light transmitting hole, and is connected to a sidewall of the light transmitting hole.

In some embodiments, the light-emitting element is disposed in an area around the light transmitting hole under the display panel.

In some embodiments, the light-emitting element is movably disposed below the light transmitting hole and above the lens; and a moving range of the light-emitting element is from a field of view of the lens to an outside of the field of view of the lens.

In some embodiments, the light converging member is formed with a first hollow region corresponding to the lens.

In some embodiments, the light-emitting element is formed with a second hollow region corresponding to the first hollow region, and an overlapping portion of the first hollow region and the second hollow region is arranged corresponding to the lens.

In some embodiments, the light-emitting element is transparent.

In some embodiments, the light-emitting element is selected from at least one of: a light-emitting array element, and an independent light-emitting device.

In some embodiments, the light-emitting element includes a side light-emitting element having a distance from the lens greater than a first predetermined distance, and a field of view of the side light-emitting element is inclined toward a center of the field of view of the light-emitting element.

In some embodiments, the light transmitting hole includes: a first through hole formed on a backlight layer of the display panel and a second through hole formed on a filter layer of the display panel and corresponding to the first through hole.

In some embodiments, a density of driving circuit of a portion of an array substrate of the display panel corresponding to the light transmitting hole is lower than a density of driving circuit of a portion of the array substrate corresponding to an outside of the light transmitting hole.

In some embodiments, the light transmitting hole further comprises a third through hole formed in the array substrate and a liquid crystal layer of the display panel, and the third through hole communicates with the first through hole and the second through hole.

In some embodiments, the terminal further includes: a light shading member arranged on a sidewall of the first through hole and used for shading a light emitted by the backlight layer.

According to a second aspect of the present disclosure, there is provided a display panel, including:

a display screen formed with a light transmitting hole; and a light-emitting element and a light converging member arranged at the light transmitting hole;

wherein the light converging member is located at a side of the light-emitting element from which light is emitted, and is used for converging the light emitted by the light-emitting element to a center of the light transmitting hole.

In some embodiments, the light converging member is disposed in the light transmitting hole, and the light converging member is connected to a sidewall of the light transmitting hole.

In some embodiments, the light converging member overlies on the light-emitting element.

In some embodiments, the light-emitting element is disposed in the light transmitting hole, and is connected to a sidewall of the light transmitting hole.

In some embodiments, the light-emitting element is disposed in an area around the light transmitting hole under the display screen.

In some embodiments, the light-emitting element is movably disposed below the light transmitting hole; and a moving range of the light-emitting element is from the light transmitting hole to an outside of the light transmitting hole.

In some embodiments, the light converging member is formed with a first hollow region arranged corresponding to a lens in an image acquisition module.

In some embodiments, the light-emitting element is formed with a second hollow region disposed corresponding to the first hollow region.

In some embodiments, the light-emitting element is transparent.

In some embodiments, the light-emitting element is selected from at least one of: a light-emitting array element, an independent light-emitting device.

In some embodiments, the light-emitting element includes a side light-emitting element having a distance to a sidewall of the light transmitting hole less than a second predetermined distance, and a field of view of the side light-emitting element is inclined toward a center of a field of view of the light-emitting element.

In some embodiments, the light transmitting hole includes: a first through hole formed on a backlight layer, and a second through hole formed on a filter layer and corresponding to the first through hole.

In some embodiments, a density of driving circuit of a portion of an array substrate corresponding to the light transmitting hole is lower than a density of driving circuit of a portion of the array substrate corresponding to an outside of the light transmitting hole.

In some embodiments, the display screen further includes: a light shading member arranged on a sidewall of the first through hole and used for shading light emitted by the backlight layer.

In some embodiments, the display panel further includes: a protective layer disposed on the filter layer;

the light transmitting hole further comprises a third through hole formed in an array substrate and a liquid crystal layer;

the third through hole communicates with the first through hole and the second through hole; and the light transmitting hole is used for being arranged corresponding to a lens in an image acquisition module.

According to a third aspect of the present disclosure, there is provided an image acquisition module, including:

a lens;

a light-emitting element disposed around the lens; and a light converging member arranged at a side of the light-emitting element from which light is emitted, wherein the light-emitting element is used for realizing an image display of an area above the lens, and the light converging member is used for converging the light emitted by the light-emitting element above the lens.

In some embodiments, the light converging member is disposed on the light-emitting element; or the light converging member is arranged in an area above the light-emitting element.

In some embodiments, the light-emitting element is disposed above the lens.

In some embodiments, the light-emitting element array is movably disposed above the lens; and a moving range of the light-emitting element is from a field of view of the lens to an outside of the field of view of the lens.

In some embodiments, the light converging member is formed with a first hollow region corresponding to the lens.

In some embodiments, the light-emitting element is formed with a second hollow region corresponding to the first hollow region, and the lens is disposed at the second hollow region.

In some embodiments, the light-emitting element is transparent.

In some embodiments, the light-emitting element is selected from at least one of: a light-emitting array element, and an independent light-emitting device.

In some embodiments, the light-emitting element includes a side light-emitting element having a distance from the lens greater than a first predetermined distance, and a field of view of the side light-emitting element is inclined toward a center of a field of view of the light-emitting element.

In some embodiments, the lens includes a compensation lens, and an effect of the compensation lens on an optical path is opposite to an effect of a condensing lens on the optical path.

In some embodiments, the lens is used to correspond to the light transmitting hole in the display panel, and the light-emitting element is used to match the light transmitting hole in the display panel.

According to a fourth aspect of the present disclosure, there is provided a display control method, wherein a light transmitting hole is formed in a display panel, a lens of an image acquisition module corresponds to the light transmitting hole, a light-emitting element and a light converging member are arranged at the light transmitting hole, and the light converging member is positioned at a side of the light-emitting element from which light is emitted; the method includes:

the light-emitting element emits light, and the light is converged on a position of the display panel corresponding to the lens after passing through the light converging member, so as to realize a display operation; and the image acquisition module acquires an image through the light transmitting hole to realize an image acquisition operation.

In some embodiments, the method further includes:

when the image acquisition module acquires an image, controlling liquid crystals in a liquid crystal layer at a position corresponding to the light transmitting hole in the display panel to deflect and transmit light.

In some embodiments, the light-emitting element emitting light includes:

controlling the light-emitting element to display a preset image; or acquiring a display content corresponding to the light transmitting hole in a display interface of the display panel, and controlling the light-emitting element to emit light according to the display content; or acquiring a display parameter of an image around the light transmitting hole in the display interface of the liquid crystal display panel, and controlling the light-emitting element to display the image according to the display parameter of the image around the light transmitting hole; the display parameter comprising at least one of: a brightness parameter, and a color parameter.

In some embodiments, the light-emitting element is movably disposed above the lens, and the method further includes:

when the image acquisition module acquires an image, controlling the light-emitting element to move until the light-emitting element is positioned outside a field of view of the lens; and when the light-emitting element emits light, controlling the light-emitting element to move until the light-emitting element is positioned in the field of view of the lens.

The technical solutions provided by the embodiments of the present disclosure can include the following beneficial effects.

From above, the lens is arranged corresponding to the light transmitting hole in the display panel, so that the lens can acquire images through the light transmitting hole, and the image capturing function is realized. The light-emitting element and the light converging member are arranged at the light transmitting hole, so that the light rays emitted by the light-emitting element can be converged above the lens through the light converging member, and further, a screen display function is realized at the position in the display panel corresponding to the light transmitting hole. The problem that the position at the opening below the screen cannot realize the screen display function has been solved, and then the entire display effect of the terminal screen has been realized and the function of front image capturing is compatible. And, the display effect at the light transmitting hole corresponding to the lens is further optimized, the problem that the user may see the lens from outside of the terminal due to poor display effect is solved, so as to optimize the full screen display effect of terminal.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 19 is an eighth schematic structural diagram of a display panel according to some embodiments;

FIG. 25 is a fifth schematic structural diagram of an image acquisition module according to some embodiments;

FIG. 26 is a sixth schematic structural diagram of an image acquisition module according to some embodiments;

FIG. 27 is a flowchart illustrating a display control method according to some embodiments.

DETAILED DESCRIPTION

Reference will now be made in detail to various embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the present disclosure. Instead, they are merely examples of apparatuses and methods consistent with aspects related to the present disclosure as recited in the appended claims.

The inventors of the present disclosure have recognized that image capturing functions and the full screen display function often cannot be realized at the same time. For a mobile phone using a Liquid-Crystal Display (LCD) panel as a screen, to realize the full screen, a camera can be disposed underneath the LCD panel. To provide the camera underneath the LCD panel, a hole is formed in the LCD panel and then the camera is provided in the hole.

Although the camera may collect the image on the front side of the mobile phone through the hole, the hole does not have a display function. As such, when the LCD panel displays the image, the image cannot be displayed at the position corresponding to the hole, and the overall display effect of the full screen cannot be realized.

On the other hand, in order to achieve the overall display effect of the full screen, some solutions are to change the front camera into a pop-up structure or other modes through a hardware structure, while sacrificing the cost, the production process, and user experience.

In a first aspect, an embodiment of the present disclosure provides a terminal. FIG. 1 to FIG. 10 are schematic structural diagrams of the terminal provided according to the embodiments of the present disclosure. The terminal can be selected from electronic equipment such as a mobile phone, a tablet and wearable equipment.

Figure 1:
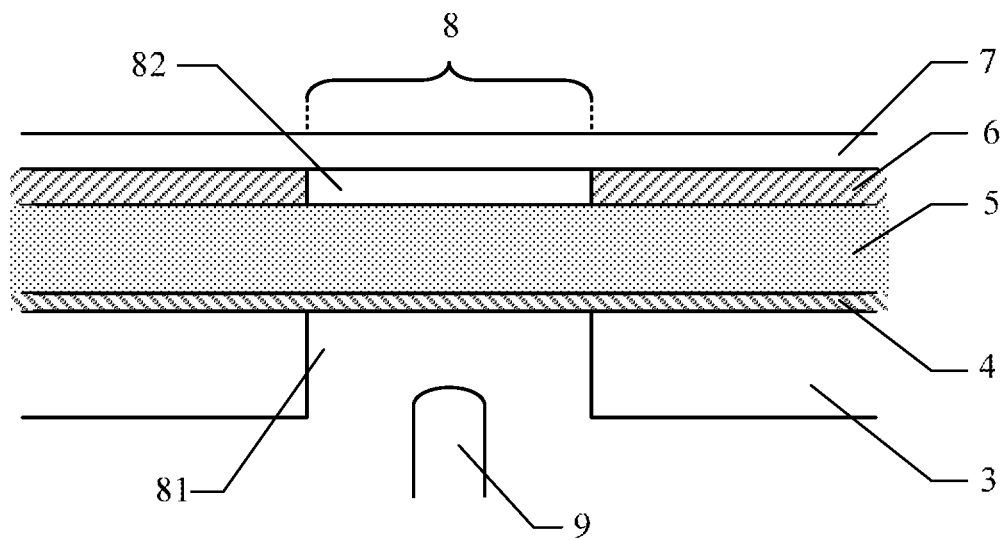
FIG. 1 is a first schematic structural diagram of a terminal according to some embodiments.
Figure 2:
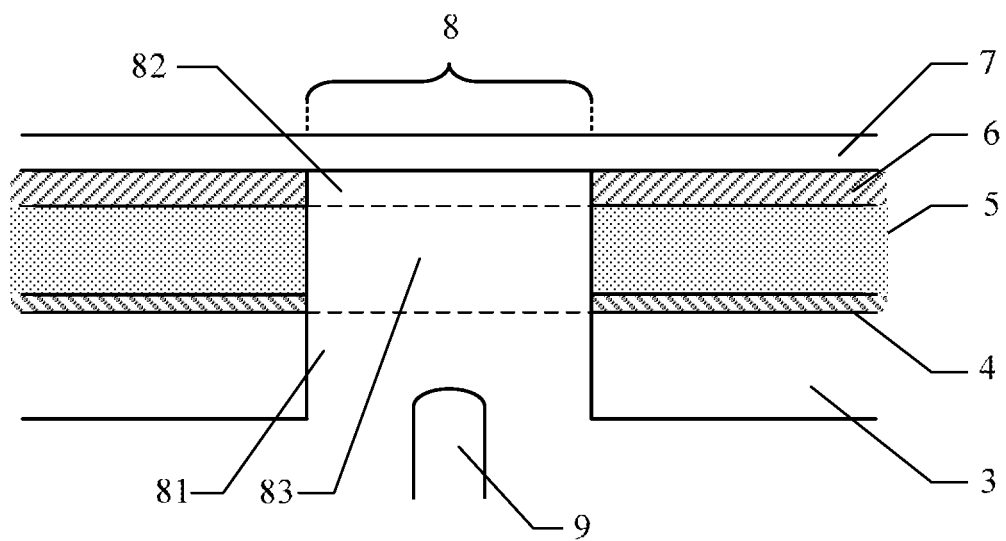
FIG. 2 is a second schematic structural diagram of a terminal according to some embodiments.

As shown in FIGS. 1 and 2, in some embodiments, the terminal includes: an image acquisition module and a display panel. The image acquisition module includes a lens 9, and a light transmitting hole 8 corresponding to the lens 9 is formed in the display panel. The lens 9 is disposed corresponding to the light transmitting hole 8 so that the light can be received by the lens 9 through the light transmitting hole. It can be understood that, in this embodiment, the lens 9 may implement image acquisition operations such as photographing, image capturing, and the like through the light transmitting hole 8.

The various device components, units, blocks, or portions may have modular configurations, or are composed of discrete components, but nonetheless can be referred to as "modules" in general. In other words, the "components," "modules" or "units" referred to herein may or may not be in modular forms.

In some embodiments, the display panel is an LCD, including a protective layer 7 and a display screen.

In some embodiments, the display panel can be any type of displays, such as an organic light-emitting diode (OLED) display.

The display screen includes a backlight layer 3, an array substrate 4, a liquid crystal layer 5 and a filter layer 6 which are sequentially stacked, and a protective layer 7 covering the filter layer 6. Typically, the protective layer 7 is a glass cover plate, so that the display panel presents a complete display surface.

It should be noted that the description of layers of the display screen is only for the purpose of scheme description, and in practical applications, there can be more than the above five layers, or some layers can be integrated into one layer, and so on, and the embodiments of the present disclosure are not limited thereto.

In some embodiments, the light transmitting hole 8 can have various implementations. As an example, as shown in FIG. 1, the light transmitting hole 8 includes a first through hole 81 formed on the backlight layer 3, and a second through hole 82 formed on the filter layer 6 corresponding to the first through hole 81. The first through hole 81 corresponding to the second through hole 82 can refer to that the first through hole 81 and the second through hole 82 have an overlapping portion in an axial direction. Accordingly, the light passes through the display panel via the first through hole 81 and the second through hole 82, and light transmission is achieved.

In this way, a density of the driving circuit of a portion of the array substrate 4 corresponding to the light transmitting hole 8 is lower than a density of the driving circuit of a portion of the array substrate 4 corresponding to an outside of the light transmitting hole 8, so that the light transmittance of the portion of the array substrate 4 corresponding to the light transmitting hole 8 is improved, and the acquisition effect of the image acquisition module is guaranteed.

Moreover, when the image acquisition module acquires an image, the terminal in the embodiments of the present disclosure may control the liquid crystal in the liquid crystal layer 5 at the light transmitting hole 8 to deflect and transmit light, so that the light entering the light transmitting hole 8 can better enter the lens 9 through the liquid crystal layer 5, and the image acquisition effect is optimized.

In a specific implementation, optionally, the liquid crystal in the liquid crystal layer 5 is controlled to be deflected and transmitted through the array substrate 4. Other methods can be used to control the liquid crystal in the liquid crystal layer 5 to deflect and transmit light, which are not limited herein.

Further, the array substrate 4 is optionally made of a transparent material, such as glass silicon or the like. The light transmittance of the transparent array substrate 4 is further improved, and the acquisition effect of the image acquisition module is optimized.

As an example, as shown in FIG. 2, the light transmitting hole 8 further includes a third through hole 83 formed in the array substrate 4 and the liquid crystal layer 5, and the third through hole 83 communicates with the first through hole 81 and the second through hole 82. The term "communicate" here can indicate that the first through hole 81, the third through hole 83, and the second through hole 82 have an overlapping portion in the axial direction.

In the above two modes, optionally, the axes of the first through hole 81, the second through hole 82, and the third through hole 83 are coincident, and the first through hole 81, the second through hole 82, and the third through hole 83 have the same shape and the same radial cross-sectional area. Therefore, when the light vertically enters the liquid crystal display panel, the light smoothly penetrates through the display screen, and the image acquisition module has a better image acquisition effect.

In this embodiment, the terminal further includes a light-emitting element 1 disposed at the light transmitting hole 8, and the display panel realizes a normal display at a position corresponding to the lens 9 by the light-emitting element 1 emitting light.

The terminal further includes a light converging member 2 arranged at the light transmitting hole 8 and located at the side of the light-emitting element 1 from which the light is emitted. The light converging member 2 is used for converging the light emitted from the light-emitting element 1 above the lens 9. Therefore, when observing from the outside of the terminal, the display content of the light-emitting element 1 on the display panel shields the lens 9, the display effect of the position at the lens 9 corresponding to the light transmitting hole of the display panel is optimized, and the user experience is improved.

In some embodiments, the light converging member 2 is disposed at a position and has a structure that the light emitted by the light-emitting element 1 is converged and then uniformly projected on the display panel corresponding to the light transmitting hole 8, so as to optimize the display effect at the position of the display panel corresponding to the light transmitting hole 8.

The structure of the light converging member 2 is not particularly limited. For example, the form of the light converging member 2 on the side from which the light-emitting element 1 emits light is not limited, and the light converging member 2 includes, for example, an arc surface, or a plurality of connected inclined surfaces. By adjusting a curvature of the arc surface or a slope of the inclined surfaces, the light converging member 2 can uniformly project the light emitted by the light-emitting element 1 onto the display panel corresponding to the light transmitting hole 8.

The terminal provided by the embodiments of the present disclosure has a screen display function at the light transmitting hole 8, so that the problem that the screen display function cannot be realized at the hole below the screen is solved, the integral display effect of the screen of the terminal is realized, and the front image capturing function is compatible. Moreover, the display effect of the position at the light transmitting hole 8 corresponding to the lens 9 is optimized through the light converging member 2, so that the problem that the lens 9 can be observed by a user from the outside of the terminal due to weak display effect is avoided. The display effect of the full screen of the terminal is optimized.

In some embodiments, the light transmitting hole 8 includes the first through hole 81 formed in the backlight layer 3, and generally the backlight layer 3 includes a light guide plate. Therefore, the first through hole 81 is formed in the backlight layer 3, and the through hole is also formed in the light guide plate. Further, the light in the light guide plate may enter the light transmitting hole 8 and is mixed into the light emitted from the light-emitting element 1, thereby affecting the display effect at the light transmitting hole 8.

Figure 3:
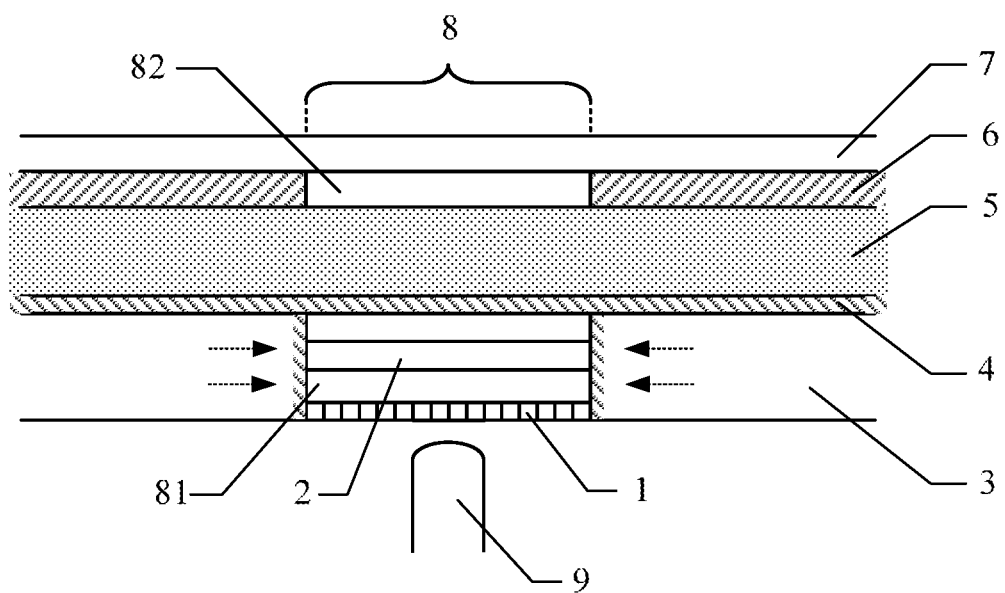
FIG. 3 is a third schematic structural diagram of a terminal according to some embodiments.

Based on the above problem, as shown in FIG. 3, the display screen further includes a light shielding member disposed on the sidewall of the first through hole 81 for shielding the light emitted from the backlight layer 3 from entering the light transmitting hole 8, so as to ensure the display effect at the light transmitting hole 8.

In practical applications, the light shielding layer may have various implementation processes and implementation modes, for example, various modes such as ink, fiber, paint, light absorbing material, light shielding material, etc. can be adopted, as long as the light shielding layer can shield the light as much as possible or prevent the light from entering the light transmitting hole 8, which is not listed here.

In some embodiments, the light-emitting element 1 can be selected from a light-emitting array element, and an independent light-emitting device. The light-emitting members in the light-emitting array element, and the independent light-emitting device can be selected from at least one of: a Light-Emitting Diode (LED), an Organic Light-Emitting diode (OLED), and the like. Particularly, when the light-emitting element 1 is the light-emitting array element, since the light emitting diode and the organic light emitting diode may display a variety of colors and are easily made in a small size, the light emitting diode and the organic light emitting diode can be used as sub-pixels for displaying images. The light emitting diode includes at least one of the following: a micro light emitting diode (Micro LED), a Mini LED, etc.

Moreover, optionally, the light-emitting element 1 is transparent. For example, the light-emitting element 1 includes a substrate carrying the light-emitting element, and the substrate is optionally a transparent substrate, on which the light-emitting element is fixed by a transparent adhesive. At this time, it is helpful to improve the light transmittance of the light-emitting element 1 and ensure the image acquisition effect of the lens 9.

In addition, the light-emitting element 1 can be a continuous plane or can be a plane formed by discretely distributed light-emitting elements.

In some embodiments, the light converging member 2 can be selected as a light condensing lens, a resin film layer, such as a polyimide resin layer, and the like. The shape of the light converging member 2 is not limited, for example, the light converging member 2 has a curved or inclined light incident surface and/or light exit surface, so as to achieve uniform distribution of the light emitted by the light-emitting elements at different positions of the light-emitting element 1 on the position of the display panel corresponding to the light transmitting hole 8, and optimize the display effect at the light transmitting hole 8.

Figure 4:
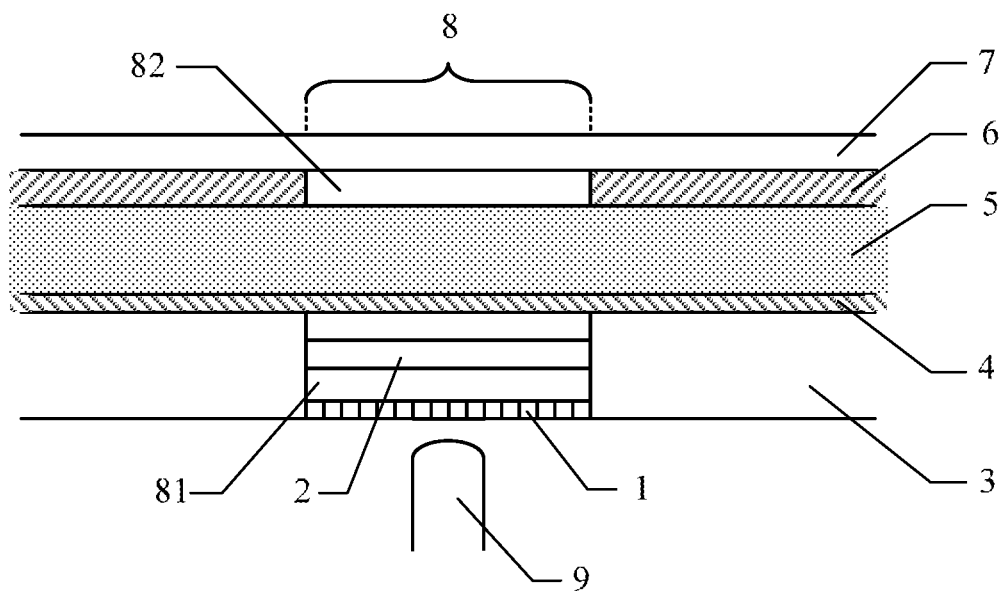
FIG. 4 is a fourth schematic structural diagram of a terminal according to some embodiments.
Figure 5A:
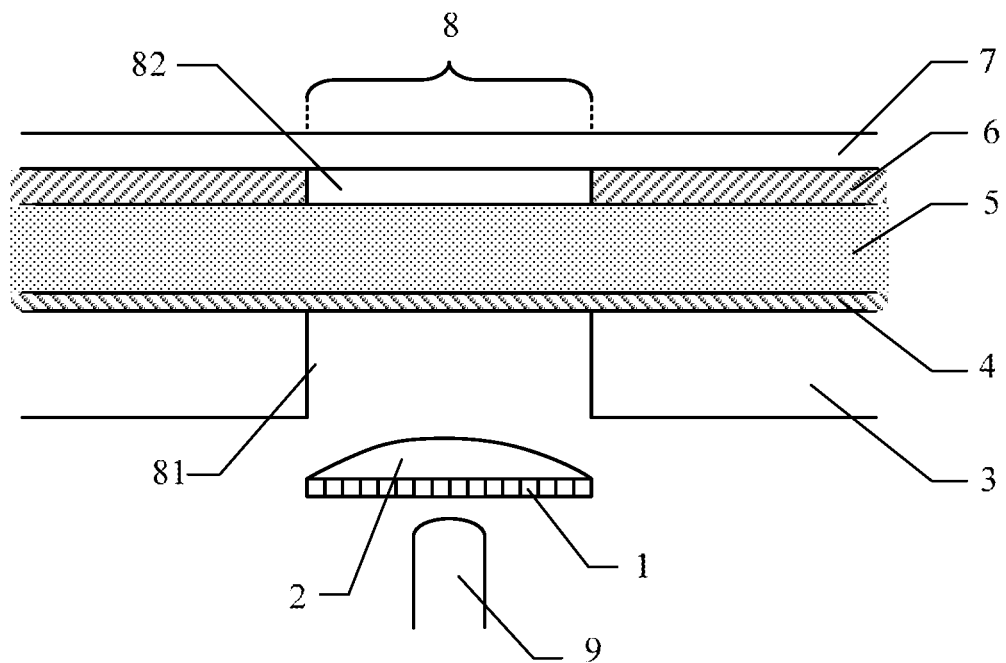
FIG. 5A is a fifth schematic structural diagram of a terminal in an implementation.
Figure 5B:
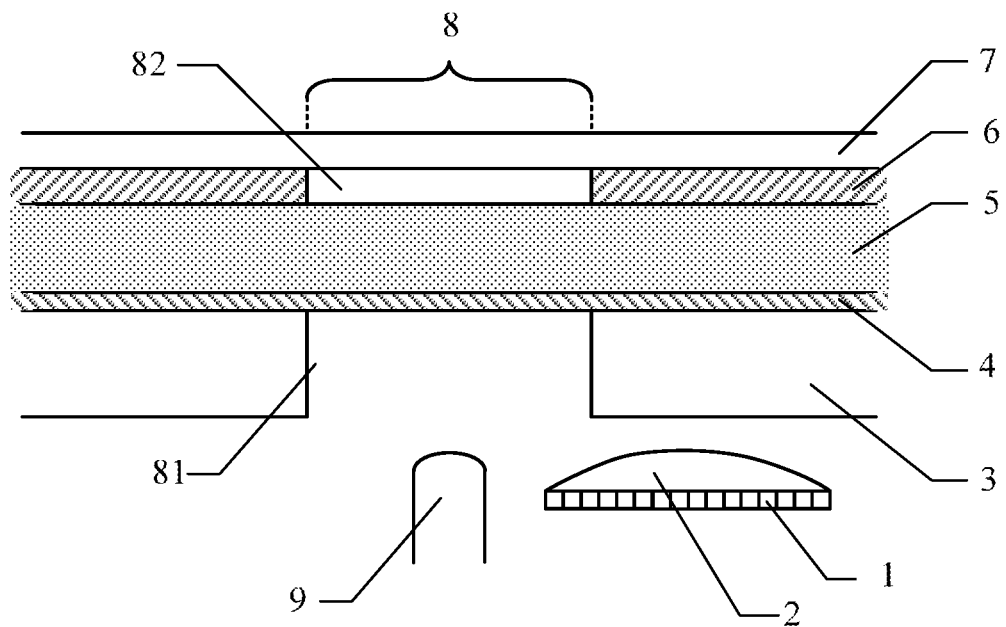
FIG. 5B is a structural diagram of a terminal similar to that of FIG. 5A in another implementation.

FIGS. 4, 5A and 5B are diagrams illustrating the positional relationship of the light-emitting element 1, the light converging member 2 and the light transmitting hole 8 according to various embodiments.

In some embodiments, as shown in FIG. 4, the light-emitting element 1 and/or the light converging member 2 are disposed in the light transmitting hole 8, and the positions where the light-emitting element 1 and/or the light converging member 2 are disposed in the light transmitting hole 8 are not limited. For example, the light-emitting element 1 and the light converging member 2 are disposed at an edge of the first through hole 81. Alternatively, the light-emitting element 1 and the light converging member 2 are disposed in the third through hole 83 as shown in FIG. 2. In this embodiment, optionally, the light-emitting element 1 and/or the light converging member 2 are attached to the sidewall of the light transmitting hole 8. In this way, the mounting and fixing are facilitated.

In some embodiments, optionally, the light-emitting element 1 and the light converging member 2 are connected to the sidewall of the light transmitting hole 8. For example, the light converging member 2 is in interference fit with the light transmitting hole 8, or the light converging member 2 is connected with the sidewall of the light transmitting hole 8 by an adhesive. In this way, the mounting of the light converging member 2 is facilitated.

In some embodiments, the light-emitting element 1 and the light converging member 2 are disposed in an area under the display panel around the light transmitting hole 8.

For example, as shown in FIG. 5A, the light-emitting element 1 and the light converging member 2 are located below the display panel and are disposed corresponding to the light transmitting holes 8. In some embodiments, the light-emitting element 1 and/or the light converging member 2 are connected to the bottom surface of the backlight layer 3 of the display screen.

In some embodiments, the light converging member 2 is coated on the light-emitting element 1. In this implementation, the light emitted by the light-emitting element 1 can be emitted out after passing through the light converging member 2, and the convergence effect of the light converging member 2 is fully realized. For example, the light converging member 2 is disposed on the light-emitting element 1 by an adhesive, where the adhesive can be selected as a transparent material to ensure the light-transmitting property of the light converging member 2.

In some embodiments, the light converging member 2 may also be connected to the sidewall of the light transmitting hole 8, and disposed in the light transmitting hole 8, and the light-emitting element 1 is disposed below the display screen. The mounting positions and the mounting modes of the light-emitting element 1 and the light converging member 2 relative to the light transmitting hole 8 can be selected according to actual needs.

Alternatively, as shown in FIG. 5B, for example, the light-emitting element 1 and the light converging member 2 are disposed in an area around the light transmitting hole 8 below the display panel. Alternatively, the light-emitting element 1 and the light converging member 2 include a portion corresponding to the light transmitting hole 8, and a portion laterally beyond the light transmitting hole 8. Also, In some embodiments, the light-emitting element 1 and the light converging member 2 are disposed around the lens 9. In this manner, the light converging member 2 is adjusted to uniformly project the light emitted from the light-emitting element 1 at the corresponding light transmitting hole 8 of the display panel.

FIGS. 6-10 illustrate implementations of the light-emitting element 1, the light converging member 2, and the lens 9 shown according to various embodiments.

Figure 6:
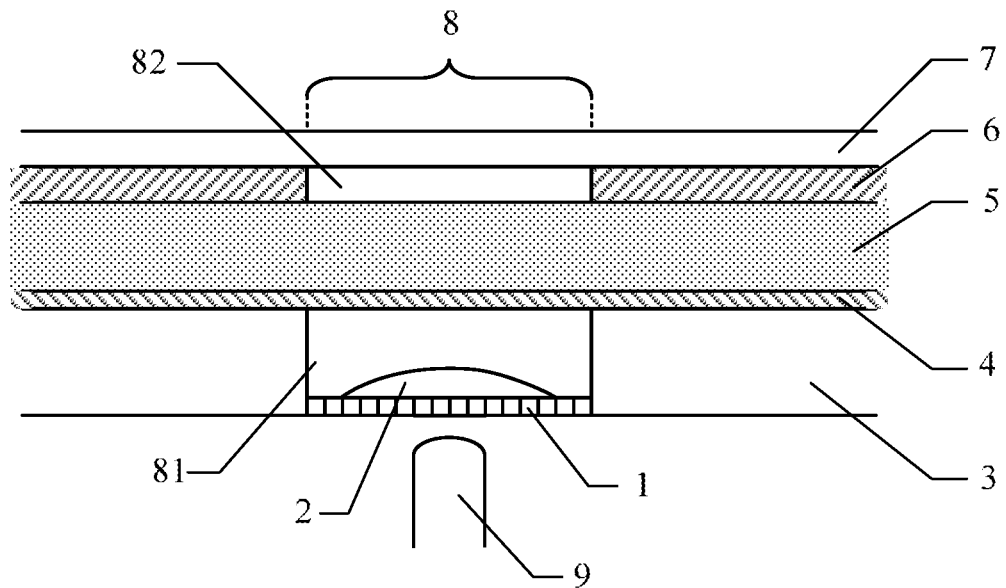
FIG. 6 is a sixth schematic structural diagram of a terminal according to some embodiments.

In some embodiments, as shown in FIG. 6, a radial edge of the light-emitting element 1 exceeds an edge of the light converging member 2, and the light-emitting element 1 extends to the sidewall of the light transmitting hole 8.

It will be appreciated that in this embodiment, the light emitted by the light-emitting elements at the edge of the light-emitting element 1 is emitted directly to achieve screen display. The light emitted by the light-emitting elements at the position far away from the edge of the light-emitting element 1 is converged and then emitted out to realize screen display in the area above the lens 9.

In some embodiments, the light condensing effect of the light converging member 2 on the light is gradually enhanced from the sidewall to the center of the light transmitting hole 8. The converging effect of the light converging member 2 on the light refers to the ability of the light converging element 2 to deflect the light towards the region above the lens 9, and optionally, is adjusted and controlled by the slope of the light exit surface of the light converging member 2. Accordingly, the light emitted by the light-emitting element 1 is uniformly projected on the display panel, and the display effect at the light transmitting hole 8 is optimized.

Figure 7A:
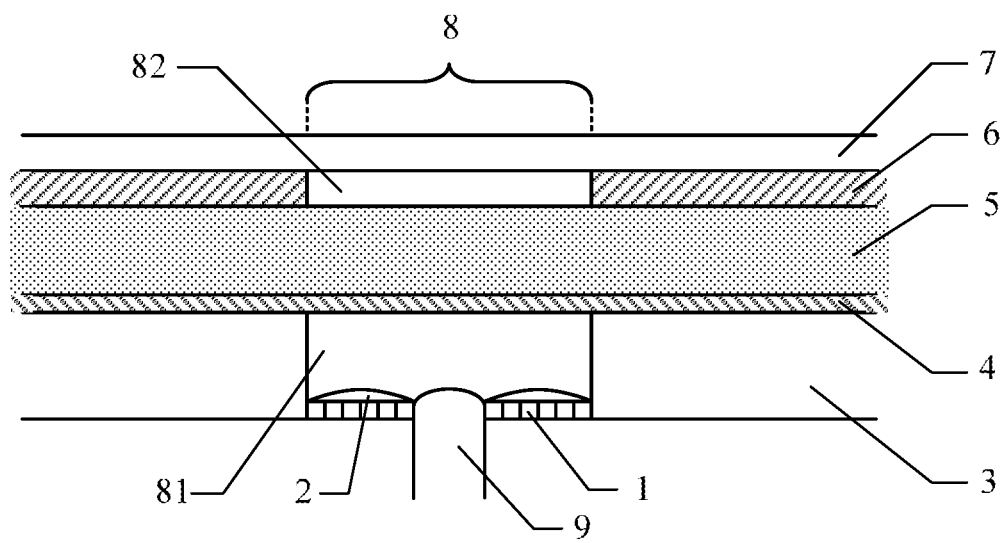
FIG. 7A is a seventh schematic structural diagram of a terminal in an implementation.
Figure 7B:
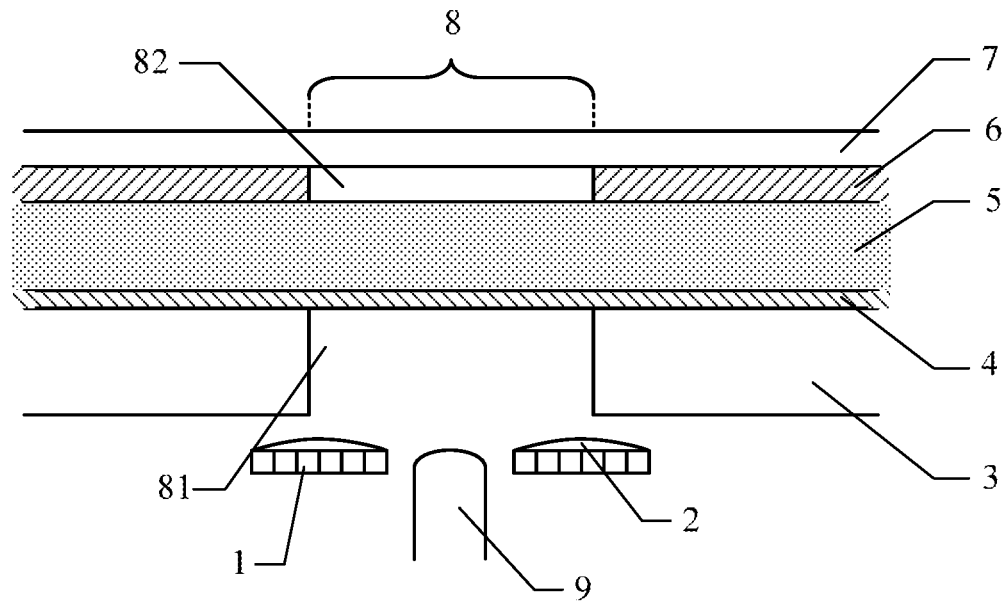
FIG. 7B is a schematic structural diagram of a terminal similar to that FIG. 7A in another implementation.
Figure 8:
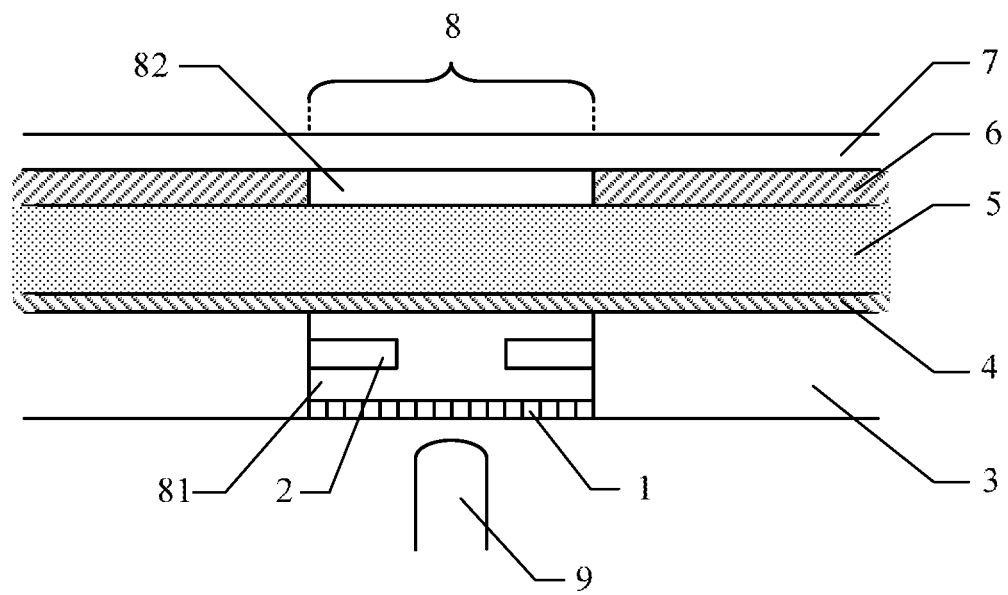
FIG. 8 is an eighth schematic structural diagram of a terminal according to some embodiments.

In some embodiments, as shown in FIGS. 7A, 7B and 8, the light converging member 2 is formed with a first hollow region corresponding to the lens 9, and in an example, the light converging member 2 is radially beyond the field of view of the lens 9. The obstruction on light entering the lens 9 is reduced through the first hollow region exceeding the field of view of the lens 9, and the acquisition effect of the image acquisition module is guaranteed.

In this embodiment, the light converging member 2 may cooperate with different forms of the light-emitting element 1, as will be illustrated below.

As an example, as shown in FIGS. 7A and 7B, the light-emitting element 1 is formed with a second hollow region corresponding to the first hollow region, and the overlapping portion of the first hollow region and the second hollow region is disposed corresponding to the lens 9. In this example, the obstruction on the light entering into the lens 9 is further reduced.

In this example, the lens 9 is inserted into the light-emitting element 1 and the light converging member 2 through the overlapping portion of the first hollow region and the second hollow region.

As an alternative, the axes of the lens 9, the first hollow region, and the second hollow region coincide. Therefore, it is beneficial to reduce the light-emitting element 1 shielding the light from entering the lens, so that the lens 9 can receive more light, and the effect of the lens 9 for acquiring images can be ensured.

Further, the height difference between the planes formed by the light-emitting element 1 and the lens 9 is smaller than or equal to a first preset distance, so that the light-emitting element 1 and the lens 9 are substantially in one plane. Accordingly, the collection effect of the lens 9 and the screen display effect of the light-emitting array element 1 are optimized.

Further, in this embodiment, as shown in FIG. 7A, the light-emitting element 1 and the light converging member 2 are optionally located within the light transmitting hole 8.

Alternatively, as shown in FIG. 7B, the light-emitting element 1 and the light converging member 2 are optionally located below the display panel and disposed in the area around the light transmitting hole 8.

As an example, as shown in FIG. 8, the light-emitting element 1 is disposed above the lens 9. At this time, the light emitted from the light-emitting element 1 is focused on the lens 9 by the light converging member 2, so as to enhance the display effect in the area above the lens 9. The problem that the display interface corresponding to the light transmitting hole 8 cannot display and displays badly when the terminal is observed from the outside is avoided, the lens 9 is further shielded, and the full screen display effect of the display panel is improved.

In some embodiments, the light-emitting element 1 is fixedly arranged at the light transmitting hole 8. In this case, the transmittance of the light-emitting element 1 is larger than a first transmittance, which is a threshold transmittance value set in accordance with an image acquisition requirement. The image acquisition requirement can be a front image capturing effect requirement that is acceptable according to specific model requirements. In practical applications, the transmittance of the light-emitting element 1 is greater than or equal to the transmittance of the liquid crystal layer 5, so as to meet the image capturing requirements of the lens 9 under the light-emitting element 1. That is, an element with a relatively high transmittance can be selected as the light-emitting element on the light-emitting element 1, and for example, an OLED or the like can be selected as the light-emitting element, so that a large amount of light can enter the lens 9 through the light-emitting element 1, and the brightness of the image captured by the lens 9 is not too low.

Figure 9:
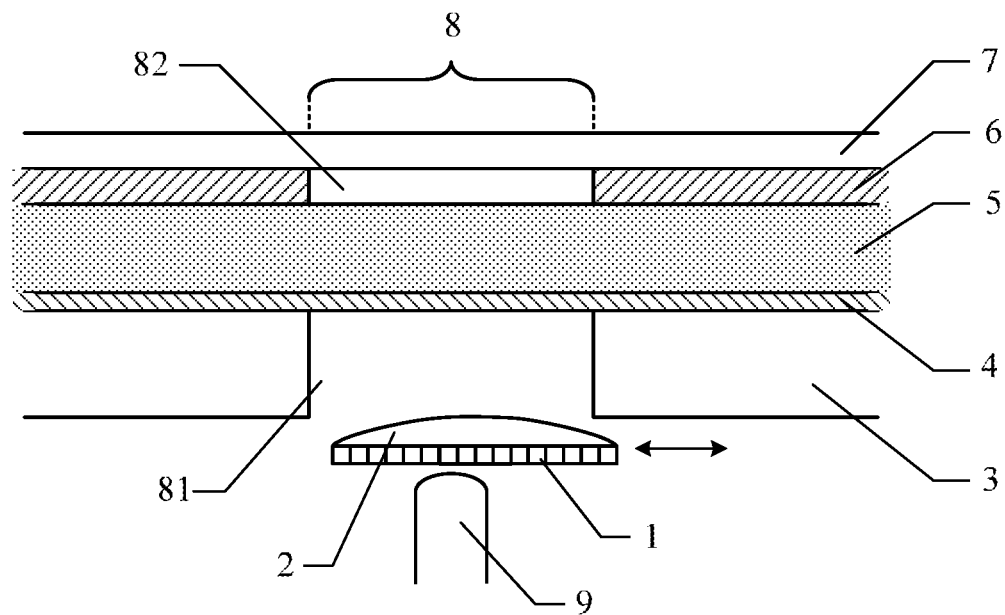
FIG. 9 is a ninth schematic structural diagram of a terminal according to some embodiments.

In some embodiments, as shown in FIG. 9, the light-emitting element 1 is movably disposed below the display panel and above the lens 9. The moving range of the light-emitting element 1 is from the light-emitting element 1 being within the field of view of the lens 9 to the light-emitting element 1 being outside the field of view of the lens 9. In an example, the moving range of the light-emitting element 1 is from the overlapping portion of the light-emitting element 1 and the light converging member 2 covering the field of view of the lens 9, to the overlapping portion of the light-emitting element 1 and the light converging member 2 moving out of the field of view of the lens 9.

When the image acquisition module acquires an image, the light-emitting element 1 moves out of the field of view of the lens 9, so that the light is prevented from reaching the lens 9 through the light transmitting hole 8, and the image acquisition effect of the lens 9 is guaranteed.

When the light-emitting element 1 displays an image, the light-emitting element 1 moves back into the field of view of the lens 9. At this time, the light-emitting element 1 corresponds to the light transmitting hole 8, and the emitted light is converged by the light converging member 2 and then is emitted from the light transmitting hole 8, so that the screen display effect of the region of the display panel corresponding to the light transmitting hole 8 is achieved.

It should be explained that when the light converging member 2 is fixed in the light transmitting hole 8, and the image acquisition module acquires an image, the overlapping portion of the light-emitting element 1 and the light converging member 2 moves out of the field of view of the lens 9. When the light-emitting element 1 displays an image, the overlapping portion of the light-emitting element 1 and the light collecting element 2 is positioned within the field of view of the lens 9.

The complete display can be achieved at the light transmitting hole 8 by the movable light-emitting element 1, and the display effect at the light transmitting hole 8 is optimized.

In some embodiments, the light converging member 2 is covered on the light-emitting element 1 and moves synchronously with the light-emitting element 1. Alternatively, the light converging member 2 is fixedly disposed in the light transmitting hole 8. Further, in the case where the light converging member 2 is fixedly disposed in the light transmitting hole 8, the form of the light converging member 2 may refer to the form having the first hollow region provided in the above embodiment. Alternatively, the light converging member is disposed above the lens 9, and it should be noted that a lens for cancelling out the influence of the light converging member 2 on the light path is preferably disposed in the lens 9 to ensure the realness of the image collected by the lens 9.

Figure 10:
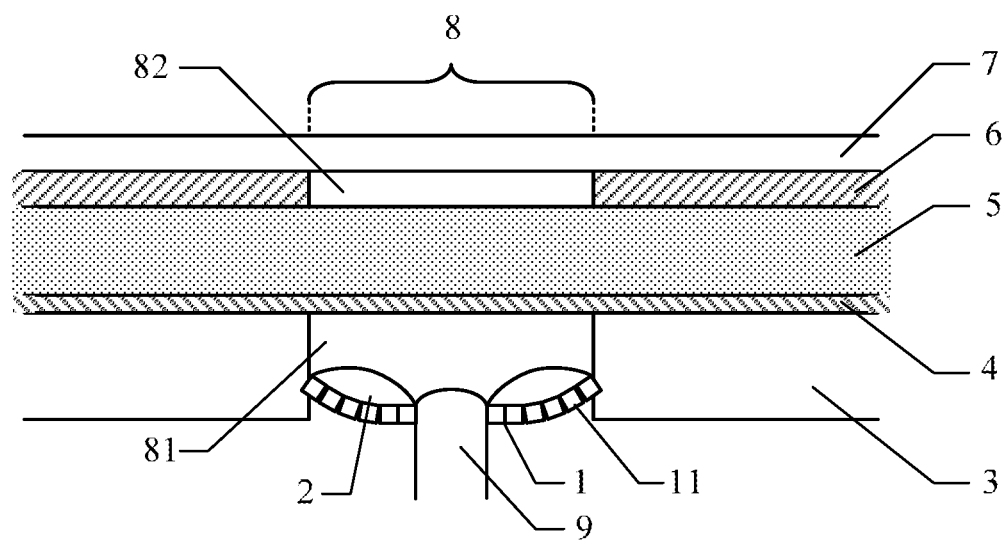
FIG. 10 is a tenth schematic structural diagram of a terminal according to some embodiments.

In some embodiments, as shown in FIG. 10, the light-emitting element 1 includes side light-emitting elements 11 having a distance from the lens greater than a first preset distance, and a field of view of the side light-emitting element 11 is inclined toward a center of the field of view of the light-emitting element. Accordingly, the light emitted from the side light-emitting elements 11 is collected toward the upper middle portion of the light transmitting hole 8. In other words, the light emitted by the side light-emitting elements 11 may cover the space above the lens 9, so that the area above the lens 9 achieves a better display effect.

Alternatively, the side light-emitting elements 11 are arranged obliquely in a plane, or the side light-emitting elements 11 are arranged obliquely in an arc-shaped plane. Both of the above ways achieve the inclination of the field of view of the side light-emitting elements 11 to the center of the field of view of the light-emitting element 1. Those skilled in the art can conceive of various modifications of the tilt structure, as long as the light emitted from the side light-emitting elements 11 can be collected in the space above the lens 9 by changing the direction of field of view of the side light-emitting elements 11, which is not necessarily listed here.

In the embodiment of the present disclosure, the terminal displays at the light transmitting hole 8 in the following modes.

In a first mode, the light-emitting element 1 is controlled to display a preset image. The preset image can be an image that is set in advance, such as a preset solid-color pattern, or a certain preset pattern, for example, the preset image can be a mobile phone brand icon, an electric quantity icon, a bluetooth icon, or the like, or can be directly customized by a user, or an icon of a certain application, or the like.

In a second mode, a display parameter of an image around the light transmitting hole 8 in the display interface of the liquid crystal display panel is acquired, and the light-emitting element 1 is controlled to display the image according to the display parameter of the image around the light transmitting hole 8. The display parameter includes, but is not limited to, at least one of the following: a brightness parameter and a color parameter.

In order to achieve a display effect closer to the full screen to improve the user experience, optionally, in the second mode, the display parameter, such as brightness, color, and the like, of the image located around the light transmitting hole 8 in the interface being displayed by the liquid crystal display panel is obtained. In this way, the light-emitting element 1 performs screen display according to the acquired display parameter of the image around the light transmitting hole 8, so that the image displayed at the light transmitting hole 8 appears to be nearly integral with the image around the hole 8.

For example, if a pink background interface is around the light transmitting hole 8 of a certain app interface in the current screen display interface, through the second mode, the pink and the brightness parameter value of the background interface can be obtained, and the light-emitting element is controlled to display the screen at the hole 8 according to the pink and brightness parameter value, so that a more coherent display effect is achieved.

In a third mode, a display content corresponding to the light transmitting hole 8 in the display interface of the liquid crystal display panel is acquired, and the light-emitting element is controlled to display an image according to the display content.

For example, if the display interface of the liquid crystal display panel is exactly a game interface, the content to be displayed near the light transmitting hole 8 is "life value 10", and the screen portion corresponding to the light transmitting hole 8 is "1", then by using the third mode, the content "1" to be displayed at the hole 8 can be obtained, and the light-emitting element 1 is controlled to display the image "1" according to the content to be displayed, so that a better display experience is realized.

Since the hole 8 is provided in the liquid crystal display panel, the contents at the light transmitting hole 8 are lost when the liquid crystal display panel displays the contents. By means of the third mode, the display content corresponding to the light transmitting hole 8 in the display interface of the liquid crystal display panel can be obtained, and then the light-emitting element 1 is controlled to display an image according to the display content. Therefore, the complete and continuous image displayed by the liquid crystal display panel is ensured, and the improvement of the display effect is facilitated.

It should also be noted that, optionally, the driving circuit of the light-emitting element 1 and the driving circuit of the array substrate 4 at the light transmitting hole 8 can be connected to the same signal input circuit or can be connected to different signal input circuits.

In some embodiments, the driving circuit of the array substrate 4 located at the light transmitting hole 8 and the driving circuit of the array substrate 4 located outside the light transmitting hole 8 can be connected to the same signal input circuit or can be connected to different signal input circuits.

In a second aspect, an embodiment of the present disclosure further provides a display panel, and FIGS. 11-20 are schematic structural diagrams of the display panel according to various embodiments of the present disclosure. In some embodiments, the display panel can be an LCD screen.

Figure 11:
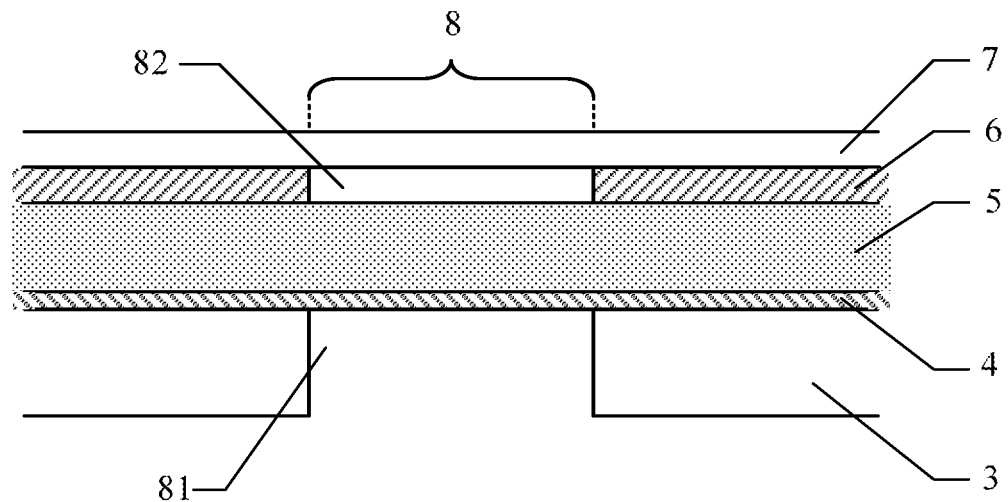
FIG. 11 is a first schematic structural diagram of a display panel according to some embodiments.
Figure 12:
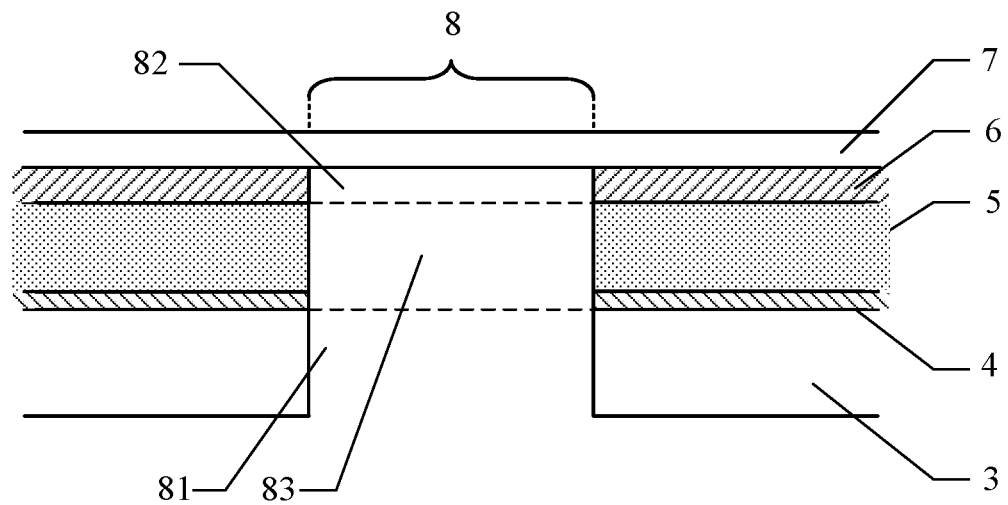
FIG. 12 is a second schematic structural diagram of a display panel according to some embodiments.

As shown in FIGS. 11 and 12, the display panel includes a protective layer 7 and a display screen, and a light transmitting hole 8 is formed in the display panel. During usage, the light transmitting hole 8 is set corresponding to a lens in the image acquisition module, so that the light passes through the light transmitting hole 8, and the normal use of the image acquisition module is guaranteed.

The display screen includes a backlight layer 3, an array substrate 4, a liquid crystal layer 5 and a filter layer 6 which are sequentially stacked, and a protective layer 7 covers the filter layer 6. Typically, the protective layer 7 is a glass cover plate, so that the display panel presents a complete display surface.

It should be noted that the layer description of the display screen is only for the purpose of scheme description, and in practical applications, there can be more than the above-mentioned five layers, or some layers can be integrated into one layer, and so on, and the embodiments of the present disclosure are not limited thereto.

In this embodiment, the light transmitting hole 8 has the following implementation manners.

As an example, as shown in FIG. 11, the light transmitting hole 8 includes a first through hole 81 formed on the backlight layer 3, and a second through hole 82 formed on the filter layer 6 corresponding to the first through hole 81. The first through hole 81 corresponding to the second through hole 82 means the first through hole 81 and the second through hole 82 have an overlapping portion in an axial direction. Accordingly, the light passes through the display panel via the first through hole 81 and the second through hole 82, and light transmission is achieved.

In this way, the density of the driving circuit of the portion, corresponding to the light transmitting hole 8, of the array substrate 4 is lower than the density of the driving circuit of the portion, corresponding to an outside of the light transmitting hole 8, of the array substrate 4, so that the light transmittance of the portion, corresponding to the light transmitting hole 8, of the array substrate 4 is improved, and the acquisition effect of the image acquisition module can be ensured.

In addition, the terminal in the embodiment of the present disclosure can control the liquid crystal in the liquid crystal layer 5 at the light transmitting hole 8 to deflect and transmit light, so as to improve the light transmittance of the liquid crystal layer 5 and optimize the acquisition effect of the image acquisition module.

In a specific implementation, optionally, the liquid crystal in the liquid crystal layer 5 is controlled to deflect and transmit light through the array substrate 4. Alternatively, other methods can be used to control the liquid crystal in the liquid crystal layer 5 to deflect and transmit light, which is not limited herein.

Further, the array substrate 4 is optionally made of a transparent material, such as glass silicon or the like. In this way, the light transmittance of the transparent array substrate 4 is further improved, and the acquisition effect of the image acquisition module is optimized.

As an example, as shown in FIG. 12, the light transmitting hole 8 further includes a third through hole 83 formed in the array substrate 4 and the liquid crystal layer 5, and the third through hole 83 communicates the first through hole 81 and the second through hole 82. It should be explained that, the term "communicate" here means that the first through hole 81, the third through hole 83, and the second through hole 82 have an overlapping portion in the axial direction. In other words, in this mode, the light transmitting hole 8 penetrates the display screen.

In the above two modes, optionally, the axes of the first through hole 81, the second through hole 82, and the third through hole 83 are coincident, and the first through hole 81, the second through hole 82, and the third through hole 83 have the same shape and the same radial cross-sectional area. Therefore, when the light vertically enters the liquid crystal display panel, the light smoothly penetrates through the display screen, and the image acquisition module has a good image acquisition effect.

The display panel further includes a light-emitting element 1 arranged at the light transmitting hole 8. The display panel realizes normal display at the position corresponding to the light transmitting hole 8 by the light-emitting element 1 emitting light.

The display panel further includes a light converging member 2 disposed at the light transmitting hole 8 and located at a side of the light-emitting element 1 from which the light is emitted. The light converging member 2 is used for converging the light emitted from the light-emitting element 1 to the central region of the light transmitting hole 8. Since the optical axis of the lens is generally coincident with the axis of the light transmitting hole 8, i.e. the lens is disposed corresponding to the central region of the light transmitting hole 8, the light emitted from the light-emitting element 1 is converged above the lens 9 by the light converging member 2. Therefore, when observing from the outside of the terminal, the display content of the light-emitting element 1 on the display panel shields the lens 9, the display effect of the lens 9 corresponding to the light transmitting hole of the display panel is optimized, and the user experience is improved.

As an embodiment, the light converging member 2 is disposed at a position and has a structure that the light emitted by the light-emitting element 1 is converged and then uniformly projected on the display panel corresponding to the light transmitting hole 8, so as to optimize the display effect at the position of the display panel corresponding to the light transmitting hole 8.

The structure of the light converging member 2 is not particularly limited. In particular, the form of the light converging member 2 on the side from which the light-emitting element 1 emits light is not limited, and the light converging member 2 includes, for example, an arc surface, or a plurality of connected inclined surfaces. By adjusting the curvature of the arc surface or the slope of the inclined surfaces, the light converging member 2 can uniformly project the light emitted by the light-emitting element 1 onto the display panel corresponding to the light transmitting hole 8.

The display panel provided by the embodiments of the present disclosure has the screen display function at the light transmitting hole 8, so that the problem that the screen display function cannot be realized at the hole below the screen is solved, the integral display effect of the terminal screen is realized, and the front image capturing function is compatible.

In some embodiments, the light transmitting hole 8 includes the first through hole 81 formed in the backlight layer 3, and generally the backlight layer 3 includes a light guide plate. Therefore, when the first through hole 81 is formed in the backlight layer 3, the through hole is also formed in the light guide plate. Further, the light in the light guide plate may enter the light transmitting hole 8 and is mixed into the light emitted from the light-emitting element 1, thereby affecting the display effect at the light transmitting hole 8.

Figure 13:
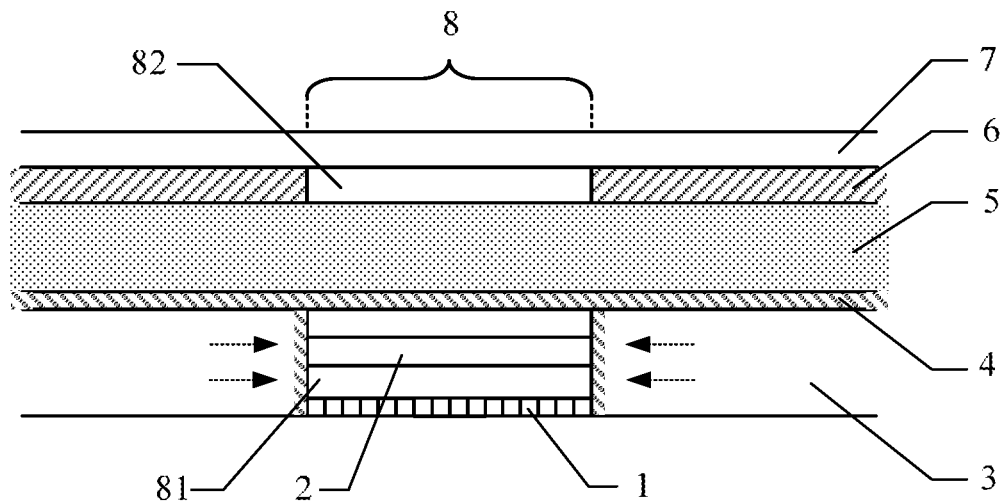
FIG. 13 is a third schematic structural diagram of a display panel according to some embodiments.

Based on the above problem, as shown in FIG. 13, the display screen further includes a light shielding member disposed on the sidewall of the first through hole 81 for shielding the light emitted from the backlight layer 3 from entering the light transmitting hole 8, so as to ensure the display effect at the light transmitting hole 8.

In practical applications, the light shielding layer may have various implementation processes and implementation methods, for example, various methods such as ink, fiber, paint, light absorbing material, light shielding material, etc. can be adopted, as long as the light shielding layer can shield light as much as possible or prevent light from entering the light transmitting hole 8, which is not listed here.

In some embodiments, the light-emitting element 1 can be selected from a light-emitting array element, and an independent light-emitting device. The light-emitting members in the light-emitting array element, and the independent light-emitting device can be selected from at least one of: a Light-Emitting Diode (LED) device, an OLED device, and the like. Particularly, when the light-emitting element 1 is the light-emitting array element, since the light emitting diode and the organic light emitting diode may display a variety of colors and are easily made in a small size, the light emitting diode and the organic light emitting diode can be used as sub-pixels for displaying images. The light emitting diode includes at least one of the following: a micro light emitting diode (Micro LED), a Mini LED, etc.

In some embodiments, the light-emitting element 1 can be transparent. For example, the light-emitting element 1 includes a substrate carrying the light-emitting element, the substrate is optionally a transparent substrate, and the light-emitting element is fixed by a transparent adhesive on the substrate. At this time, it is helpful to improve the transmittance of the light-emitting element 1, and then to ensure the image acquisition effect of the lens matched with the display panel.

In addition, in some applications, the light-emitting elements 1 can be a continuous plane or can be a plane formed by discretely distributed light-emitting elements.

In some embodiments, the light converging member 2 can be a light condensing lens, a resin film layer, such as a polyimide resin layer, and the like. The shape of the light converging member 2 is not limited, for example, the light converging member 2 has a curved or inclined light incident surface and/or light exit surface, so as to achieve uniform distribution of the light emitted by the light-emitting elements at different positions of the light-emitting element 1 at the position of the display panel corresponding to the light transmitting hole 8, and optimize the display effect at the position of the light transmitting hole 8.

Figure 14:
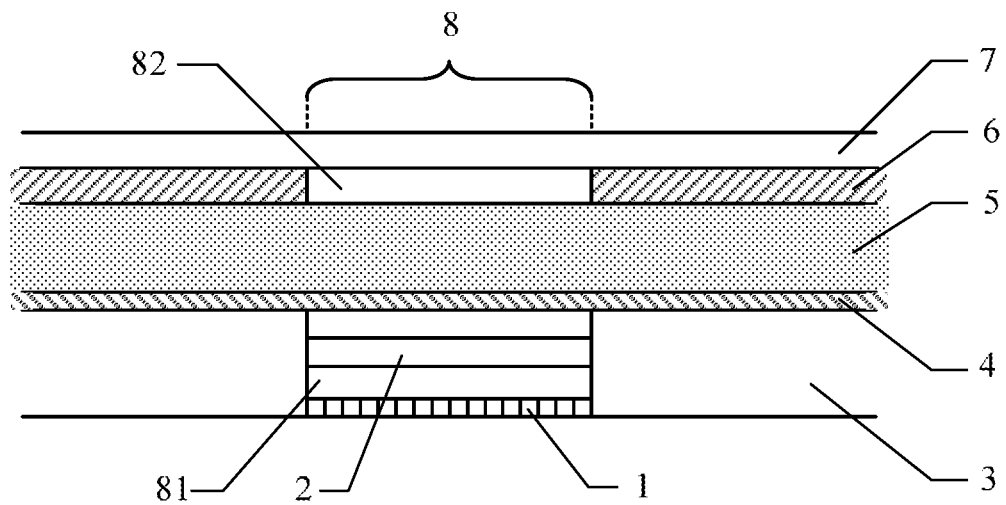
FIG. 14 is a fourth schematic structural diagram of a display panel according to some embodiments.
Figure 15A:
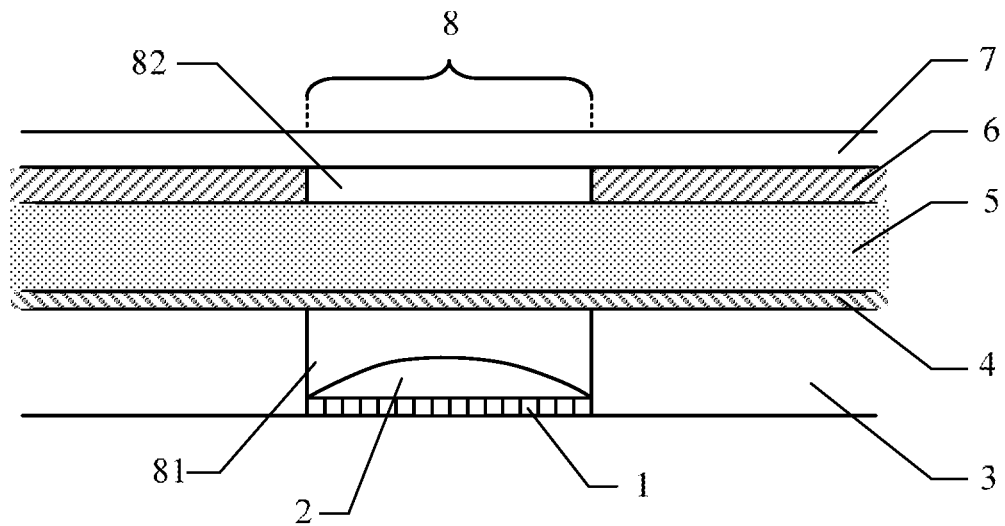
FIG. 15A is a fifth schematic structural diagram of a display panel in an implementation.
Figure 15B:
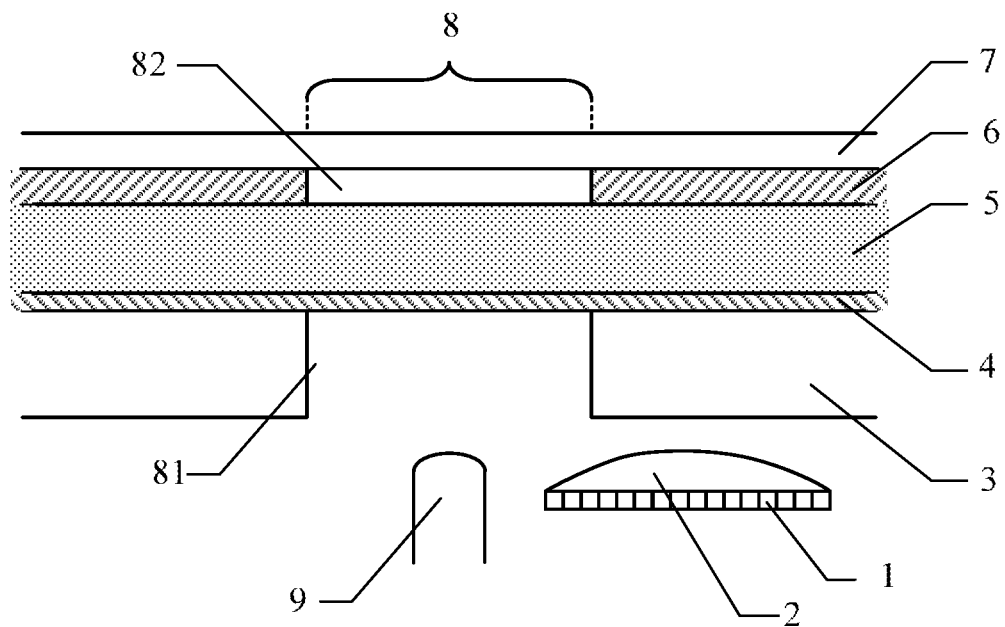
FIG. 15B is a schematic structural diagram of a display panel similar to that of FIG. 15A in another implementation.

FIGS. 14, 15A and 15B are views showing the positional relationships of the light-emitting element 1, the light converging member 2 and the light transmitting hole 8 according to various embodiments.

In some embodiments, as shown in FIG. 14, the light-emitting element 1 and/or the light converging member 2 are disposed in the light transmitting hole 8, and the positions where the light-emitting element 1 and the light converging member 2 are disposed in the light transmitting hole 8 are not limited. For example, the light-emitting element 1 and the light converging member 2 are disposed at the edge of the first through hole 81. Alternatively, the light-emitting element 1 and the light converging member 2 are disposed in the third through hole 83 as shown in FIG. 12. In this embodiment, the light-emitting element 1 and/or the light converging member 2 can be attached to the sidewall of the light transmitting hole 8, and in this way, it is facilitated for mounting and fixing.

In this embodiment, the light-emitting element 1 and the light converging member 2 are connected to the sidewall of the light transmitting hole 8. For example, the light converging member 2 is in interference fit with the light transmitting hole 8, or the light converging member 2 is connected with the sidewall of the light transmitting hole 8 by an adhesive. In this way, the mounting of the light converging member 2 is facilitated.

In some embodiments, the light-emitting element 1 and the light converging member 2 are disposed in an area under the display panel around the light transmitting hole 8.

For example, as shown in FIG. 15A, the light-emitting element 1 and the light converging member 2 are located below the display screen and are disposed corresponding to the light transmitting hole 8. In some embodiments, the light-emitting element 1 and/or the light converging member 2 are connected to the bottom surface of the backlight layer 3 of the display screen.

In some embodiments, the light converging member 2 is coated on the light-emitting element 1. In this way, the light emitted by the light-emitting element 1 is emitted out after passing through the light converging member 2, and the convergence effect of the light converging member 2 is fully realized. For example, the light converging member 2 is disposed on the light-emitting element 1 by an adhesive, and optionally, the adhesive is a transparent material to ensure the light-transmitting property of the light converging member 2.

In some embodiments, the light converging member 2 can be connected to the sidewall of the light transmitting hole 8, and disposed in the light transmitting hole 8, and the light-emitting element 1 is disposed below the display screen. The mounting positions and the mounting modes of the light-emitting element 1 and the light converging member 2 relative to the light transmitting hole 8 can be selected according to actual needs.

Alternatively, as shown in FIG. 15B, for example, the light-emitting element 1 and the light converging member 2 are disposed in an area around the light transmitting hole 8 below the display screen. Alternatively, the light-emitting element 1 and the light converging member 2 include a portion corresponding to the light transmitting hole 8, and a portion laterally beyond the light transmitting hole 8. In some embodiments, the light-emitting element 1 and the light converging member 2 are disposed around the light transmitting hole 8. In this manner, the light converging member 2 is adjusted to uniformly project the light emitted from the light-emitting element 1 at the position of the display panel corresponding to the light transmitting hole 8.

FIGS. 16-20 illustrate implementations of the light-emitting element 1 and the light converging member 2 according to various embodiments.

Figure 16:
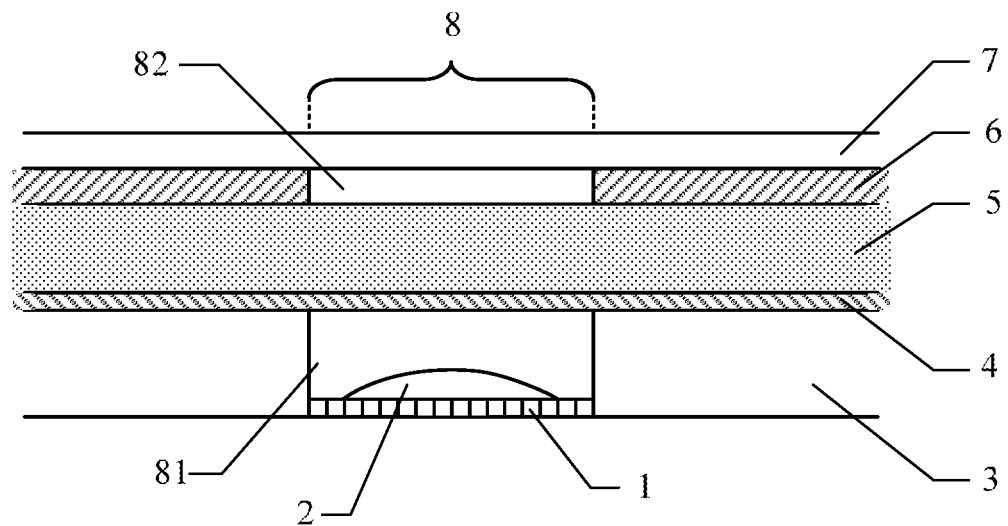
FIG. 16 is a sixth schematic structural diagram of a display panel according to some embodiments.

In some embodiments, as shown in FIG. 16, the radial edge of the light-emitting element 1 exceeds the edge of the light converging member 2, and the light-emitting element 1 extends to the sidewall of the light transmitting hole 8.

The light emitted from the light-emitting element 1 corresponding to the light transmitting hole 8 is displayed at the display panel corresponding to the light transmitting hole 8. Therefore, it can be understood that if the light emitted from the light-emitting element 1 is converged toward the central area of the light transmitting hole 8, the display effect of the side portion of the light transmitting hole 8 is weakened.

It will be understood that in this embodiment, the light emitted from the light-emitting elements at the edge of the light-emitting element 1 is directly emitted out of the light transmitting hole 8 to realize the screen display of the side portion of the light transmitting hole 8. The light rays emitted by the light-emitting elements far away from the edge of the light-emitting element 1 are converged and then emitted out of the screen at the central part of the light transmitting hole 8 for display.

In some embodiments, the light converging effect of the light converging member 2 on the light can be gradually enhanced from the sidewall to the center of the light transmitting hole 8. The light converging effect of the light converging member 2 on the light rays refers to the ability of the light converging member 2 to deflect the light rays towards the region above the light transmitting hole 8, and optionally, the adjustment and control is performed by the slope of the light exit surface of the light converging member 2. Accordingly, the light emitted by the light-emitting element 1 is uniformly projected on the display panel, and the display effect at the light transmitting hole 8 is optimized.

Figure 17A:
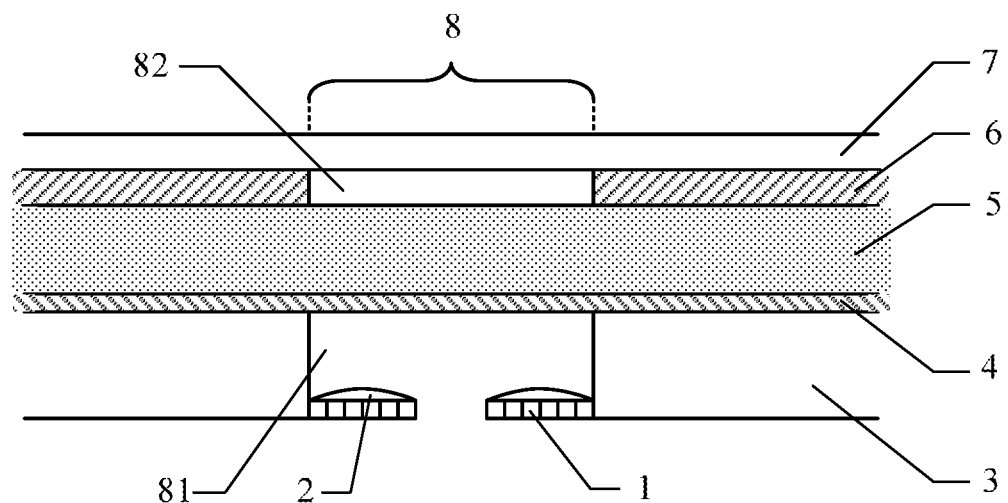
FIG. 17A is a seventh schematic structural diagram of a display panel in an implementation.
Figure 17B:
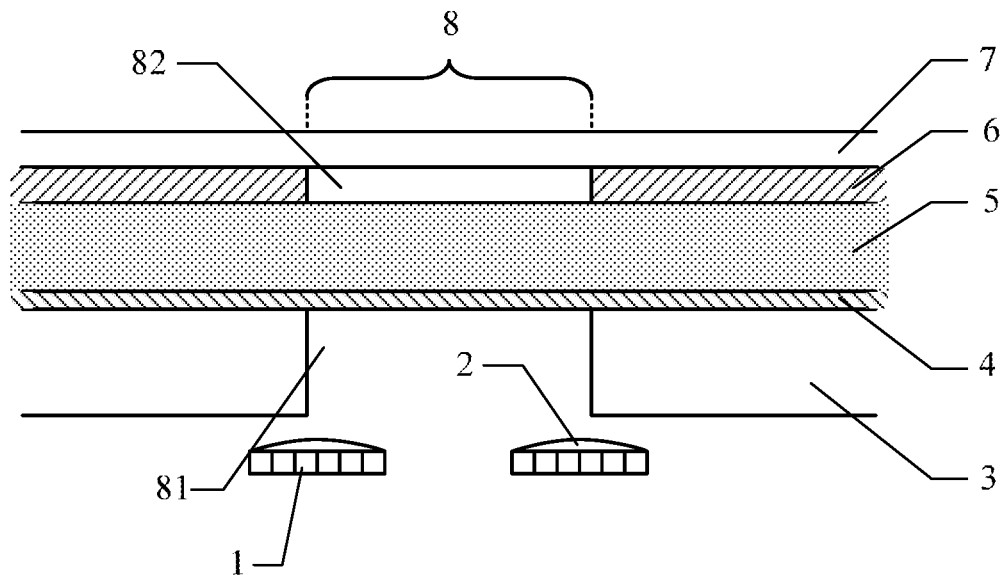
FIG. 17B is a schematic structural diagram of a display panel similar to that of FIG. 17A in another implementation.
Figure 18:
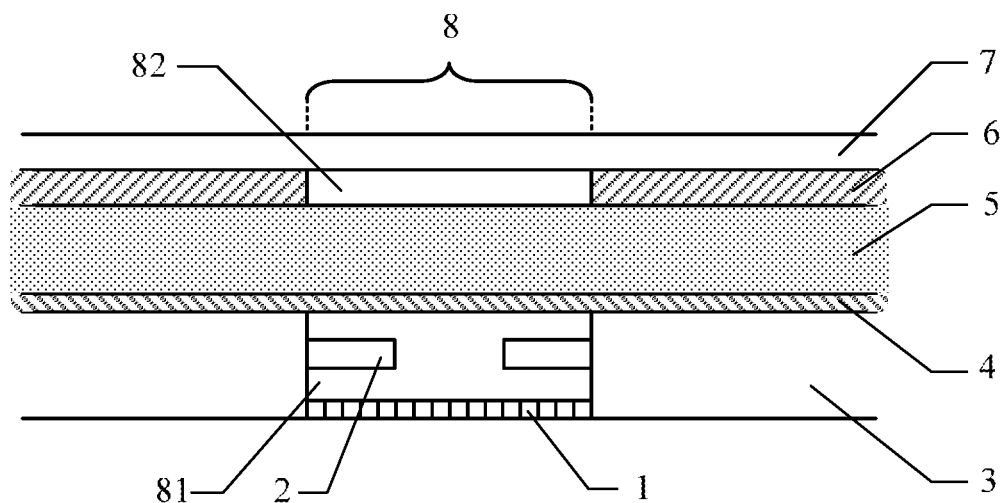
FIG. 18 is an eighth schematic structural diagram of a display panel according to some embodiments.

In some embodiments, as shown in FIGS. 17A, 17B, and 18, the light converging member 2 is formed with a first hollow region arranged corresponding to the lens. In an example, the first hollow region extends beyond the field of view of the lens with which it is matched. The obstruction on the light entering the lens is reduced through the first hollow region, and the acquisition effect of the image acquisition module is guaranteed.

In this embodiment, the light converging member 2 can be combined with different forms of the light-emitting element 1, as will be illustrated below.

As an example, as shown in FIGS. 17A and 17B, the light-emitting element 1 is formed with a second hollow region corresponding to the first hollow region, and the overlapping portion of the first hollow region and the second hollow region is disposed corresponding to the lens. In this example, the obstruction on the light rays entering into the lens is further reduced.

In some embodiments, the axes of the first hollow region and the second hollow region are coincident, and the radial areas are equal, so as to reduce the energy loss when the light penetrates through the light transmitting hole 8.

Further, in this embodiment, as shown in FIG. 17A, the light-emitting element 1 and the light converging member 2 are optionally located in the light transmitting hole 8.

Alternatively, as shown in FIG. 17B, the light-emitting element 1 and the light converging member 2 are located below the display screen and disposed in the area around the light transmitting hole 8.

As an example, as shown in FIG. 18, the light-emitting element 1 is a complete light emitting surface. At this time, when matching with the image acquisition module, the light-emitting element 1 overlies above the lens. The light converging member 2 converges the light emitted from the light-emitting element 1 to the central area of the light transmitting hole 8, i.e. above the lens, so as to enhance the display effect of the central area of the light transmitting hole 8. The problem that the display interface corresponding to the light transmitting hole 8 cannot display and displays badly when observing from the outside of the terminal is avoided, the lens is further shielded, and the full screen display effect of the display panel is improved.

In some embodiments, the light-emitting element 1 is fixedly arranged at the light transmitting hole 8. In this case, the transmittance of the light-emitting element 1 is larger than a first transmittance, which is a threshold transmittance value set in accordance with an image acquisition requirement. The image acquisition requirement can be front image capturing effect requirement that is acceptable according to specific model requirements. In some applications, the transmittance of the light-emitting element 1 is greater than or equal to the transmittance of the liquid crystal layer 5, so as to meet the image capturing requirements of the lens under the light-emitting element 1. That is, an element with a relatively high transmittance can be selected as the light-emitting element on the light-emitting element 1, and for example, an OLED or the like can be selected as the light-emitting element, so that a large amount of light can enter the lens through the light-emitting element 1, and the brightness of the image captured by the lens is not too low.

Figure 19:
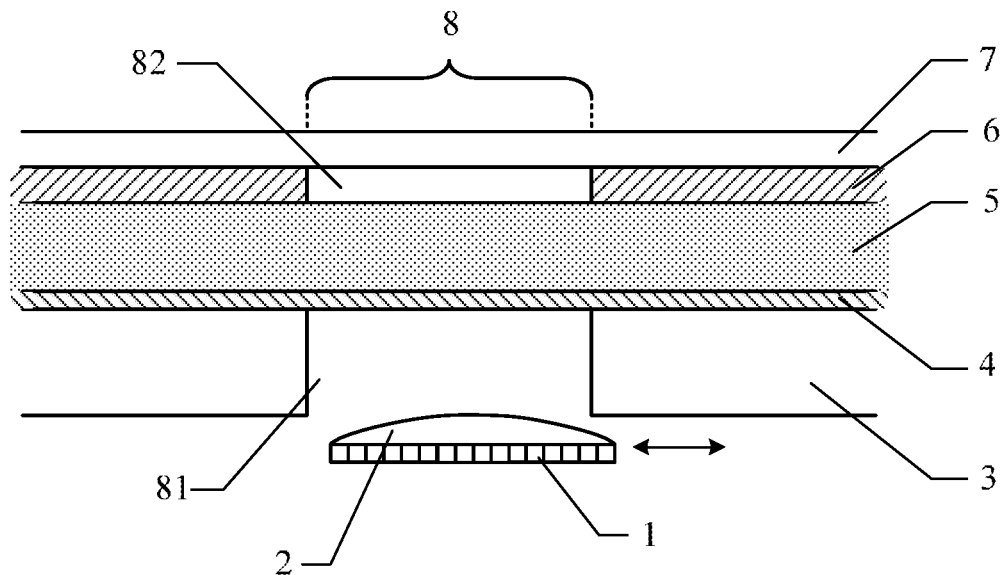
FIG. 19 is a ninth schematic structural diagram of a display panel according to some embodiments.

In some embodiments, as shown in FIG. 19, optionally, the light-emitting element 1 is movably disposed under the display panel. The moving range of the light-emitting element 1 is from the overlapping portion of the light-emitting element 1 and the light converging member 2 covering the light transmitting hole 8 to the overlapping portion of the light-emitting element 1 and the light converging member 2 being staggered from the light transmitting hole 8. The "staggered" means that the overlapping portion of the light-emitting element 1 and the light converging member 2 does not overlap the light transmitting hole 8.

Because the image acquisition module is usually provided corresponding to the light transmitting hole 8, when the image acquisition module acquires the image, the overlapping portion of the light-emitting element 1 and light converging member 2 staggers with the light transmitting hole 8, thereby avoiding hindering the light to reach the lens through the light transmitting hole 8, and ensuring the image acquisition effect of lens.

When the light-emitting element 1 displays an image, the overlapping portion of the light-emitting element 1 and the light converging member 2 covers the light transmitting hole 8, and further covers the field of view of the lens. At this time, the light emitted by the light-emitting element 1 is converged by the light converging member 2 and then emitted from the light transmitting hole 8, so that the screen display effect of the region of the display panel corresponding to the light transmitting hole 8 is achieved.

The movable light-emitting element 1 can display at the light transmitting hole 8 completely, and the display effect at the light transmitting hole 8 is optimized.

In some embodiments, the light converging member 2 is covered on the light-emitting element 1 and moves synchronously with the light-emitting element 1. Alternatively, the light converging member 2 is fixedly disposed in the light transmitting hole 8.

As for the form of the light converging member 2, the manner of having the first hollow region provided in the above embodiment can be referred to. Or, the light converging element covers above the lens 9, and it should be noted that in an example, a lens for counteracting the influence of the light converging member 2 on the light path is disposed in the lens of the image acquisition module matched with the display panel, so as to ensure the realness of the image acquired by the lens.

Figure 20:
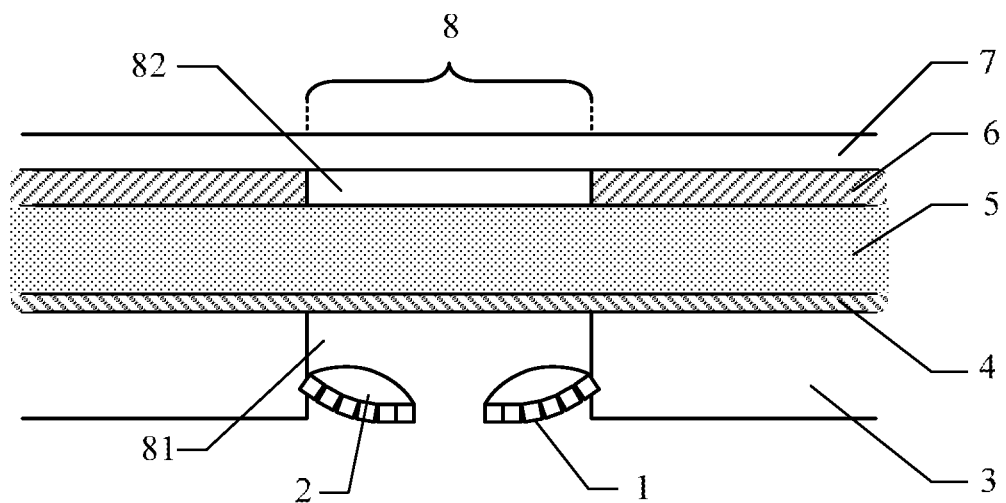
FIG. 20 is a tenth schematic structural diagram of a display panel according to some embodiments.

In some embodiments, as shown in FIG. 20, the light-emitting element 1 includes side light-emitting elements 11 having a distance to the light transmitting hole 8 less than a second preset distance. The field of view of the side light-emitting element 11 is inclined to the center of the field of view of the light-emitting element. Accordingly, the light emitted from the side light-emitting elements 11 is collected toward the upper middle portion of the light transmitting hole 8, the display effect of the central region of the light transmitting hole 8 is optimized, and the components located below the light transmitting hole 8 are better shielded.

Alternatively, the side light-emitting elements 11 are arranged obliquely in a plane, or the side light-emitting elements 11 are arranged obliquely in an arc-shaped plane. Both of the above ways achieve the inclination of the field of view of the side light-emitting elements 11 to the center of the field of view of the light-emitting element 1. Those skilled in the art can conceive of various modifications of the tilt structure, as long as the light emitted from the side light-emitting elements 11 is collected in the space above the lens 9 by changing the direction of the field of view of the side light-emitting elements 11, which is not necessarily listed here.

In some embodiments of the present disclosure, the terminal displays at the light transmitting hole 8 in the following modes.

In some embodiments of the present disclosure, the terminal displays at the light transmitting hole 8 in the following modes.

In a first mode, the light-emitting element 1 is controlled to display a preset image. The preset image can be an image that is set in advance, such as a preset solid-color pattern, or a certain preset pattern, for example, the preset image can be a mobile phone brand icon, an electric quantity icon, a bluetooth icon, or the like, or can be directly customized by a user, or an icon of a certain application, or the like.

In a second mode, a display parameter of an image around the light transmitting hole 8 in the display interface of the liquid crystal display panel is acquired, and the light-emitting element 1 is controlled to display the image according to the display parameter of the image around the light transmitting hole 8. The display parameter includes, but is not limited to, at least one of the following: a brightness parameter and a color parameter.

To achieve a display effect closer to the full screen to improve the user experience, optionally, in the second mode, the display parameter, such as brightness, color, and the like, of the image located around the light transmitting hole 8 in the interface being displayed by the liquid crystal display panel is obtained. In this way, the light-emitting element 1 performs screen display according to the acquired display parameter of the image around the light transmitting hole 8, so that the image displayed at the light transmitting hole 8 appears to be nearly integral with the image around the hole 8.

For example, if a pink background interface is around the light transmitting hole 8 of a certain app interface in the current screen display interface, through the second mode, the pink and the brightness parameter value of the background interface can be obtained, and the light-emitting element is controlled to display the screen at the hole 8 according to the pink and brightness parameter value, so that a more coherent display effect is achieved.

In a third mode, a display content corresponding to the light transmitting hole 8 in the display interface of the liquid crystal display panel is acquired, and the light-emitting element is controlled to display an image according to the display content.

For example, if the display interface of the liquid crystal display panel is exactly a game interface, the content to be displayed near the light transmitting hole 8 is "life value 10", and the screen portion corresponding to the light transmitting hole 8 is "1", then by using the third mode, the content "1" to be displayed at the hole 8 can be obtained, and the light-emitting element 1 is controlled to display the image "1" according to the content to be displayed, so that a better display experience is realized.

Since the hole 8 is provided in the liquid crystal display panel, the contents at the light transmitting hole 8 are lost when the liquid crystal display panel displays the contents. By means of the third mode, the display content corresponding to the light transmitting hole 8 in the display interface of the liquid crystal display panel can be obtained, and then the light-emitting element 1 is controlled to display an image according to the display content. Therefore, the complete and continuous image displayed by the liquid crystal display panel is ensured, and the improvement of the display effect is facilitated.

It should also be noted that, optionally, the driving circuit of the light-emitting element 1 and the driving circuit of the array substrate 4 at the light transmitting hole 8 can be connected to the same signal input circuit or can be connected to different signal input circuits.

Alternatively, the driving circuit of the array substrate 4 located at the light transmitting hole 8 and the driving circuit of the array substrate 4 located outside the light transmitting hole 8 can be connected to the same signal input circuit or can be connected to different signal input circuits.

In some embodiments, the driving circuit of the light-emitting element 1 and the driving circuit of the array substrate 4 at the light transmitting hole 8 can be connected to the same signal input circuit or can be connected to different signal input circuits.

In some embodiments, the driving circuit of the array substrate 4 at the light transmitting hole 8 and the driving circuit of the array substrate 4 outside the light transmitting hole 8 can be connected to the same signal input circuit or can be connected to different signal input circuits.

In a third aspect, an embodiment of the present disclosure further provides an image acquisition module, and FIGS. 21-26 are schematic structural diagrams of the image acquisition module according to various embodiments.

As shown in FIGS. 21-26, the image acquisition module includes a lens 9, a light-emitting element 1, and a light converging member 2.

Figure 21A:
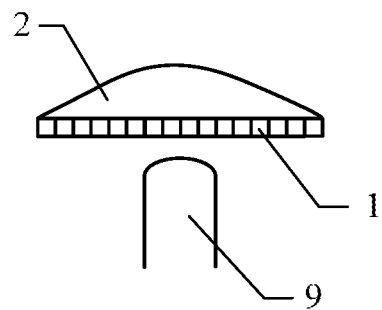
FIG. 21A is a first schematic structural diagram of an image acquisition module in an implementation.

The light-emitting element 1 is arranged around the lens 9 for enabling image display of the area above the lens 9. The positional relationship of the light-emitting element 1 and the lens 9 has various implementation manners. Alternatively, as shown in FIG. 21A, the light-emitting element 1 is disposed above the lens 9. Alternatively, as shown in FIG. 23B, the light-emitting element 1 is provided on the side of the lens 9.

In some embodiments, the light-emitting element 1 can be selected from a light-emitting array element, and an independent light-emitting device. The light-emitting members in the light-emitting array element, and the independent light-emitting device can be selected from at least one of: an LED device, an OLED device, and the like. Particularly, when the light-emitting element 1 is the light-emitting array element, since the light emitting diode and the organic light emitting diode may display a variety of colors and are easily made in a small size, the light emitting diode and the organic light emitting diode can be used as sub-pixels for displaying images. The light emitting diode includes at least one of the following: a micro light emitting diode (Micro LED), a Mini LED, etc.

Moreover, the light-emitting element 1 can be transparent. For example, the light-emitting element 1 includes a substrate carrying the light-emitting element, the substrate is optionally a transparent substrate, on which the light-emitting element is fixed by a transparent adhesive. At this time, it is helpful to improve the light transmittance of the light-emitting element 1 and ensure the image acquisition effect of the lens 9.

In some applications, the light-emitting elements 1 can be a continuous plane or can be a plane formed by discretely distributed light-emitting elements.

The light converging member 2 is disposed on the side of the light-emitting element 2 from which light is emitted, and is used for collecting the light emitted from the light-emitting element 1 above the lens 9.

As an example, the light converging member 2 is disposed at a position and has a structure that the light emitted by the light-emitting element 1 is converged and then uniformly projected on the display panel corresponding to the light transmitting hole 8, so as to optimize the display effect at the position of the display panel corresponding to the light transmitting hole 8.

The light converging member 2 can be a light converging lens, a resin film layer such as a polyimide resin layer, or the like. The shape of the light converging member 2 is not limited, for example, the light converging member 2 has a curved or inclined light incident surface and/or light exit surface, so as to achieve uniform distribution of the light emitted from the light-emitting elements at different positions of the light-emitting element 1 over the position of the display panel corresponding to the lens 9.

It should be noted that, when the image acquisition module is matched with the display panel formed with the light transmitting hole, the lens 9 is disposed corresponding to the light transmitting hole. The screen display at the position of the display panel corresponding to the light transmitting hole is realized through the light-emitting element 1. The light is converged to the upper part of the lens 9 through the light converging member 2, and the display effect of the position at the light transmitting hole 8 corresponding to the lens 9 is optimized. Accordingly, the display content on the display panel corresponding to the light transmitting hole 8 shields the lens 9, and a good full screen display effect is achieved.

In addition, for the convenience of description, the image acquisition module matching with the display screen formed with the light transmitting hole is used as an example for explanation.

Figure 21B:
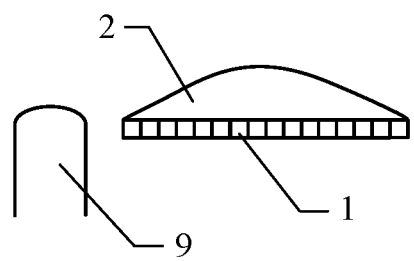
FIG. 21B is a schematic structural diagram of an image acquisition module similar to that of FIG. 21A in another implementation.

In some embodiments, as shown in FIGS. 21A and 21B, the light converging member 2 is coated on the light-emitting element 1. For example, the light converging member 2 is disposed on the light-emitting element 1 by an adhesive, and optionally, the adhesive can be a transparent material, so as to ensure the light transmission performance of the light converging member 2.

In some embodiments, the light converging member 2 is disposed at an upper region of the light-emitting element 1, for example, the light converging member 2 is fixedly connected to the display panel disposed above the light-emitting element 1.

Figure 22:
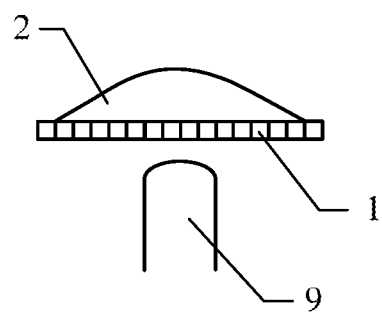
FIG. 22 is a second schematic structural diagram of an image acquisition module according to some embodiments.

In some embodiments, as shown in FIG. 22, the radial edge of the light-emitting element 1 is beyond the edge of the light converging member 2. When the image acquisition module is matched with the display panel, in a radial direction of the light transmitting hole, the edge of the light-emitting element 1 extends to the light transmitting hole, and a gap is formed between the edge of the light converging member 2 and the sidewall of the light transmitting hole.

It will be appreciated that in this embodiment, the light emitted by the light-emitting elements at the edges of the light-emitting element 1 is emitted directly to achieve screen display. The light rays emitted by the light-emitting elements at the position far away from the edge of the light-emitting element 1 are converged and then emitted out to realize screen display in the area above the lens 9.

In some embodiments, the light condensing effect of the light converging member 2 on the light can be gradually enhanced from the edge to the center. The converging effect of the light converging member 2 on the light rays refers to the ability of the light converging member 2 to deflect the light rays toward the region above the lens 9, and can be adjusted and controlled by the slope of the light exit surface of the light converging member 2. Accordingly, the light emitted by the light-emitting element 1 is uniformly projected on the display panel, and the display effect of the area above the lens 9 is optimized.

Figure 23A:
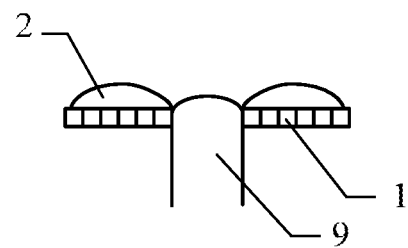
FIG. 23A is a third schematic structural diagram of an image acquisition module in an implementation.
Figure 23B:
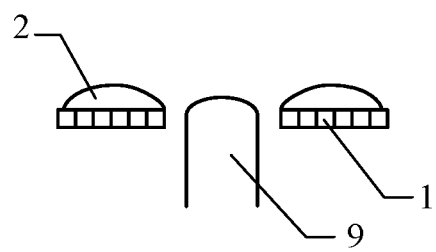
FIG. 23B is a schematic structural diagram of an image acquisition module similar to that of FIG. 23A in another implementation.
Figure 24:
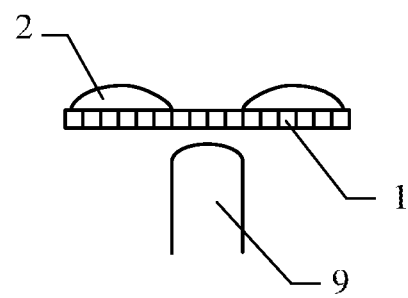
FIG. 24 is a fourth schematic structural diagram of an image acquisition module according to some embodiments.

In some embodiments, as shown in FIGS. 23A, 23B, and 24, the light converging member 2 is formed with a first hollow region corresponding to the lens 9. In an example, the first hollow region radially extends beyond the field of view of the lens 9. The obstruction on the light entering the lens 9 is reduced through the first hollow region exceeding the field of view of the lens 9, and the acquisition effect of the image acquisition module is guaranteed.

In this embodiment, the light converging member 2 can be combined with different forms of the light-emitting element 1, as will be illustrated below.

As an example, as shown in FIGS. 23A and 23B, the light-emitting element 1 is formed with a second hollow region corresponding to the first hollow region, and the overlapping portion of the first hollow region and the second hollow region is provided corresponding to the lens 9. In this example, the obstruction on the light rays entering into the lens 9 is further reduced.

As an alternative, the axes of the lens 9, the first hollow region, and the second hollow region coincide. Therefore, it can be reduced to shield light from entering the lens by the light-emitting element 1, so that the lens 9 can receive more light, and the effect of the lens 9 for acquiring images can be ensured.

Further, the height difference between the plane formed by the light-emitting element 1 and the lens 9 is smaller than or equal to a first preset distance, so that the light-emitting element 1 and the lens 9 are substantially in one plane. Accordingly, the acquisition effect of the lens 9 and the screen display effect of the light-emitting array element 1 are optimized.

Further, in this embodiment, as shown in FIG. 23A, optionally, the lens 9 is inserted and connected to the light-emitting element 1 and the light converging member 2 by the overlapping portion of the first hollow region and the second hollow region. Alternatively, as shown in FIG. 23B, the light-emitting element 1 and the light converging member 2 are disposed at both side regions of the lens 9.

As an example, as shown in FIG. 24, the light-emitting element 1 is disposed above the lens 9. At this time, the light emitted from the light-emitting element 1 is focused on the lens 9 by the light converging member 2, so as to enhance the display effect in the area above the lens 9. The problem that the display interface corresponding to the light transmitting hole 8 cannot display and displays badly when observing from the outside of the terminal is avoided, the lens 9 is further shielded, and the full screen display effect of the display panel is improved.

In some embodiments, the light-emitting element 1 is fixedly arranged at the light transmitting hole. In this case, the transmittance of the light-emitting element 1 is larger than the first transmittance, which is a threshold transmittance value set in accordance with an image acquisition requirement. The image acquisition requirement can be a front image capturing effect requirement that is acceptable according to the specific model requirements. In practical applications, the transmittance of the light-emitting element 1 is greater than or equal to the transmittance of the liquid crystal layer 5, so as to meet the image capturing requirements of the lens 9 under the light-emitting element 1. That is, an element with a relatively high transmittance can be selected as the light-emitting element on the light-emitting element 1, and for example, an OLED or the like can be selected as the light-emitting element, so that a large amount of light can enter the lens 9 through the light-emitting element 1, and the brightness of the image captured by the lens 9 is not too low.

In some embodiments, as shown in FIG. 25, the light-emitting element 1 is movably disposed below the display panel, above the lens 9. The moving range of the light-emitting element 1 is from the light-emitting element 1 being within the field of view of the lens 9 to the light-emitting element 1 being outside the field of view of the lens 9. In an example, the moving range of the light-emitting element 1 is from the overlapping portion of the light-emitting element 1 and the light converging member 2 covering the field of view of the lens 9, to the overlapping portion of the light-emitting element 1 and the light converging member 2 moving out of the field of view of the lens 9.

When the image acquisition module is matched with a display panel with a light transmitting hole, the light-emitting element 1 is arranged corresponding to the light transmitting hole. In such a case, when the image acquisition module acquires an image, the light-emitting element 1 moves out of the field of view of the lens 9, so that the image acquisition effect of the lens 9 is ensured. When the light-emitting element 1 displays an image, the light-emitting element 1 moves back into the field of view of the lens 9. At this time, the light emitted by the light-emitting element 1 is converged by the light converging member 2 and then emitted from the light transmitting hole, so that the screen display effect of the region of the display panel corresponding to the light transmitting hole is achieved.

It should be note that, when the light converging member 2 is fixedly disposed in the upper region of the light-emitting element 1, for example, the light converging member 2 is disposed in the light transmitting hole of the display panel, when the image acquisition module acquires an image, the overlapping portion of the light-emitting element 1 and the light converging member 2 moves out of the field of view of the lens 9. When the light-emitting element 1 displays an image, the overlapping portion of the light-emitting element 1 and the light converging member 2 is positioned within the field of view of the lens 9.

A complete display effect can be achieved above the lens 9 by means of the movable light-emitting element 1. When being matched with the display panel, a complete display effect can be presented at the light transmitting hole, and the full screen presentation of the display screen is optimized.

In some embodiments, the light converging member 2 is covered on the light-emitting element 1 and moves synchronously with the light-emitting element 1. Alternatively, the light converging member 2 is connected to other components, for example, the light converging member 2 is connected to the sidewall of the light transmitting hole 8 of the display panel.

As for the form of the light converging member 2, the manner of having the first hollow region provided in the above embodiment can be referred to. Alternatively, the light converging member 2 is covered above the lens 9.

When the light converging member 2 covers the lens 9, optionally, the lens 9 includes a lens which has an opposite effect to that of the light converging member 2 on the light path, so that the influence of the light converging member 2 on the light path is compensated, and the realness of the image acquired by the lens 9 is guaranteed.

In some embodiments, as shown in FIG. 26, the light-emitting element 1 includes the side light-emitting elements 11 having a distance from the lens greater than the first preset distance, and the field of view of the side light-emitting element 11 is inclined toward the center of the field of view of the light-emitting element. Accordingly, the light emitted from the side light-emitting elements 11 is collected toward the upper middle portion of the light transmitting hole 8. In other words, the light emitted by the side light-emitting elements 11 may cover the space above the lens 9, so that the area above the lens 9 achieves a better display effect.

Alternatively, the side light-emitting elements 11 are arranged obliquely in a plane, or the side light-emitting elements 11 are arranged obliquely in an arc-shaped plane. Both of the above ways achieve the inclination of the field of view of the side light-emitting elements 11 to the center of the field of view of the light-emitting element 1. Those skilled in the art can conceive of various modifications of the tilt structure, as long as the light emitted from the side light-emitting elements 11 is collected in the space above the lens 9 by changing the direction of the field of view of the side light-emitting elements 11, which is not necessarily listed here.

In a fourth aspect, an embodiment of the present disclosure further provides a schematic diagram of a display control method as shown in FIG. 27.

The method shown in the present disclosure can be applied to a liquid crystal display panel. A light transmitting hole is formed in the display panel, a lens of the image acquisition module corresponds to the light transmitting hole, the light-emitting element and the light converging member are arranged at the light transmitting hole, and the light converging member is positioned on one side of the light-emitting element from which light emits.

As shown in FIG. 27, the method can include the following steps.

In step S1, a light-emitting element emits light, and the light is converged at a position on a display panel corresponding to a lens after passing through a light converging member, so that a display operation is realized.

In step S2, the image acquisition module acquires an image through the light transmitting hole, to realize an image acquisition operation.

According to the embodiment of the disclosure, the light transmitting hole can be arranged on the liquid crystal display panel, and the position of the light transmitting hole corresponds to the lens of the image acquisition module.

A light-emitting element and a light converging member are also arranged at the light transmitting hole. The light-emitting element may realize the screen display operation on the liquid crystal display panel through the light transmitting hole. The light converging member collects light emitted by the light-emitting element above the lens, and the display effect of the light transmitting hole corresponding to the lens is optimized.

When the image acquisition operation is carried out, the image acquisition module is controlled to acquire the image through the light transmitting hole so as to realize the image acquisition operation.

In some embodiments, the light transmitting hole arranged in the liquid crystal display panel includes a first through hole arranged in the backlight layer and a second through hole arranged in the filter layer, and the positions of the first through hole and the second through hole correspond to each other. The display control method further includes the following steps.

When the image acquisition module acquires an image, the liquid crystal in the liquid crystal layer at the light transmitting hole is controlled to deflect and transmit light.

In some embodiments, if an image is required to be acquired by the image acquisition module, as a further scheme, the liquid crystal in the liquid crystal layer at the light transmitting hole can be controlled to deflect and transmit light, so that the light can pass through the liquid crystal layer and enter the lens, and the lens can acquire the image through the light transmitting hole to realize the image acquisition operation.

In another embodiment of the present disclosure, the light-emitting element in the above steps performs the display operation on the liquid crystal display panel through the light transmitting hole, including but not limited to:

acquiring the display content at the corresponding light transmitting hole in the display interface of the liquid crystal display panel, and controlling the light-emitting element to display an image according to the display content; or controlling the light-emitting element to display a preset image;

or, acquiring a display parameter of an image around the light transmitting hole in the display interface of the liquid crystal display panel, and controlling the light-emitting element to display the image according to the display parameter of the image around the light transmitting hole; the display parameter including at least one of: a brightness parameter, a color parameter, etc.

The embodiment of the present disclosure shows still another display control method. In this embodiment, a light transmitting hole is disposed in the liquid crystal display panel, and the light-emitting element is movably disposed at the light transmitting hole and above the lens. The display control method further includes the following steps.

When the image acquisition module acquires an image, the light-emitting element is controlled to move, so that the overlapping portion of the light-emitting element and the light converging member is positioned outside the field of view of the lens.

When the light-emitting element performs display operation at the light transmitting hole, the light-emitting element is controlled to move, so that the overlapping portion of the light-emitting element and the light converging member covers the field of view of the lens.

In some embodiments, the light-emitting element is movably disposed at the light transmitting hole, and the lens is disposed below the light-emitting element. When the image acquisition module acquires images, the light-emitting element can be controlled to move out from the upper part of the lens, so that the lens is prevented from being shielded by the light-emitting element, and the image acquisition effect of the lens is ensured. When the light-emitting element performs display operation on the liquid crystal display panel, the light-emitting element can be controlled to move above the lens so as to control the light-emitting element to emit light from the light transmitting hole above the lens, and the display operation of the light-emitting element at the light transmitting hole is realized.

The display control method disclosed by the embodiments of the present disclosure can be suitable for a terminal being opened below the screen and having a light-emitting element arranged at the opening, and is used for realizing both the front image capturing function and the screen display function in the full screen scheme. The method may also be applied to a screen being opened below the screen and having a light-emitting element arranged at the opening as well as related devices with the screen, and the opening is used for providing a picture acquisition channel for a lens, so that both the image acquisition function and the screen display function in the full screen scheme are realized. The method can be also suitable for a camera module with the light-emitting element and related devices with the lens, and the image acquisition function and the screen display function in the full screen scheme are both achieved through matching with the screen with the opening.

Figure 28:
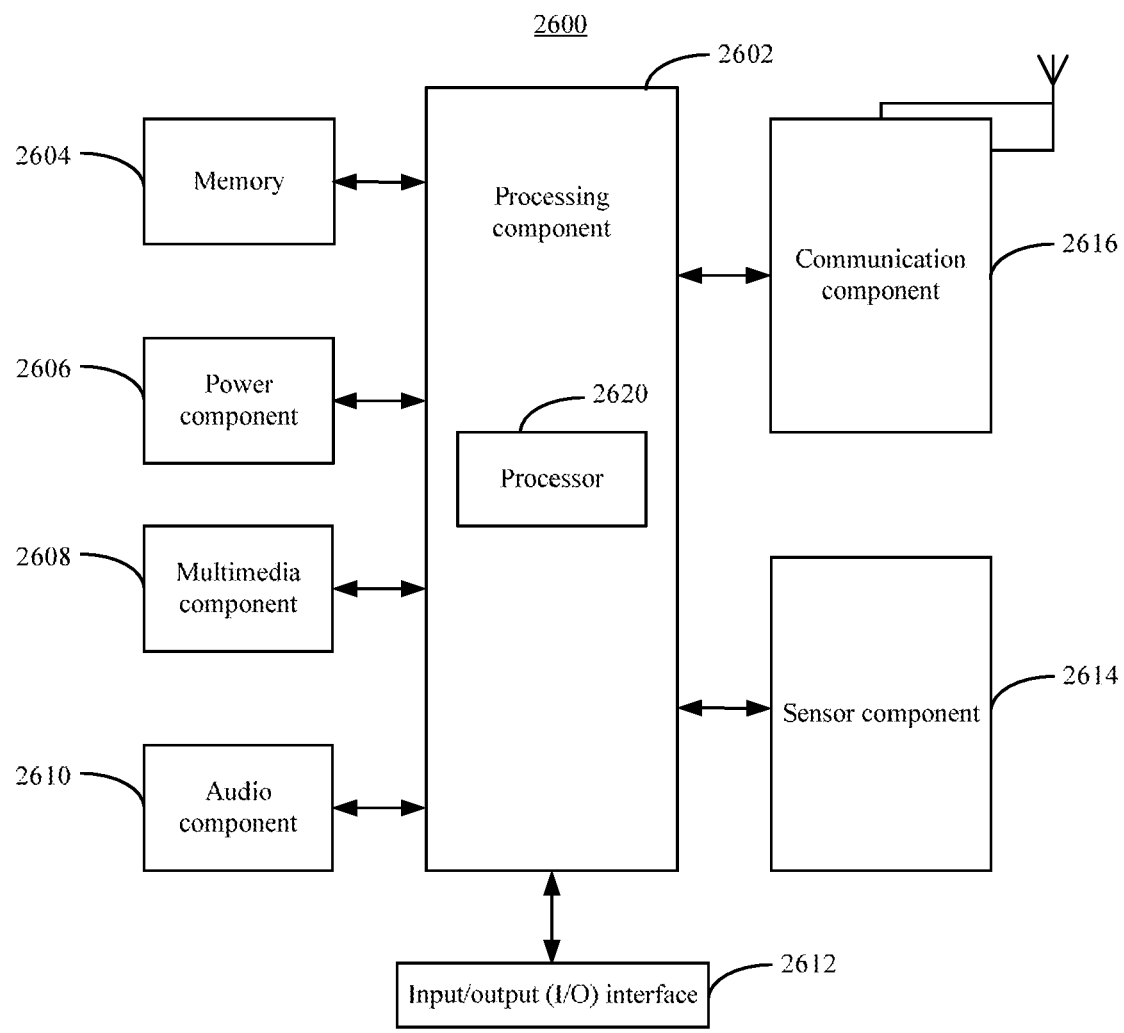
FIG. 28 is a block diagram of a terminal according to some embodiments.

FIG. 28 is a schematic diagram of a terminal 2600 according to an embodiment of the disclosure. For example, the device 2600 can be a mobile phone, a computer, a digital broadcast terminal, a messaging device, a gaming console, a tablet, a medical device, exercise equipment, a personal digital assistant, and the like.

Referring to FIG. 28, the device 2600 can include one or more of the following components: a processing component 2602, a memory 2604, a power component 2606, a multimedia component 2608, an audio component 2610, an input/output (I/O) interface 2612, a sensor component 2614, and a communication component 2616.

The processing component 2602 typically controls overall operations of the device 2600, such as the operations associated with display, telephone calls, data communications, camera operations, and recording operations. The processing component 2602 can include one or more processors 2620 to execute instructions to perform all or part of the steps in the above described methods. Moreover, the processing component 2602 can include one or more modules which facilitate the interaction between the processing component 2602 and other components. For instance, the processing component 2602 can include a multimedia module to facilitate the interaction between the multimedia component 2608 and the processing component 2602.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

The memory 2604 is configured to store various types of data to support the operation of the device 2600. Examples of such data include instructions for any applications or methods operated on the device 2600, contact data, phonebook data, messages, pictures, video, etc. The memory 2604 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2606 provides power to various components of the device 2600. The power component 2606 can include a power management system, one or more power sources, and any other components associated with the generation, management, and distribution of power in the device 2600.

The multimedia component 2608 includes a screen providing an output interface between the device 2600 and the user. In some embodiments, the screen can include an LCD and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2608 includes a front camera and/or a rear camera. The front camera and the rear camera may receive an external multimedia datum while the device 2600 is in an operation mode, such as a photographing mode or a video mode. Each of the front camera and the rear camera can be a fixed optical lens system or have focus and optical zoom capability.

The audio component 2610 is configured to output and/or input audio signals. For example, the audio component 2610 includes a microphone ("MIC") configured to receive an external audio signal when the device 2600 is in an operation mode, such as a call mode, a recording mode, and a voice recognition mode. The received audio signal can be further stored in the memory 2604 or transmitted via the communication component 2616. In some embodiments, the audio component 2610 further includes a speaker to output audio signals.

The I/O interface 2612 provides an interface between the processing component 2602 and peripheral interface modules, such as a keyboard, a click wheel, buttons, and the like. The buttons can include, but are not limited to, a home button, a volume button, a starting button, and a locking button.

The sensor component 2614 includes one or more sensors to provide status assessments of various aspects of the device 2600. For instance, the sensor component 2614 may detect an open/closed status of the device 2600, relative positioning of components, e.g., the display and the keypad, of the device 2600, a change in position of the device 2600 or a component of the device 2600, a presence or absence of user contact with the device 2600, an orientation or an acceleration/deceleration of the device 2600, and a change in temperature of the device 2600. The sensor component 2614 can include a proximity sensor configured to detect the presence of nearby objects without any physical contact. The sensor component 2614 may also include a light sensor, such as a CMOS or CCD image sensor, for use in imaging applications. In some embodiments, the sensor component 2614 may also include an accelerometer sensor, a gyroscope sensor, a magnetic sensor, a pressure sensor, or a temperature sensor.

The communication component 2616 is configured to facilitate communication, wired or wirelessly, between the device 2600 and other devices. The device 2600 can access a wireless network based on a communication standard, such as WiFi, 2G, or 3G, or a combination thereof. In one exemplary embodiment, the communication component 2616 receives a broadcast signal or broadcast associated information from an external broadcast management system via a broadcast channel. In one exemplary embodiment, the communication component 2616 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 2600 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 2604, executable by the processor 2620 in the device 2600, for performing the above-described methods. For example, the non-transitory computer-readable storage medium can be a ROM, a RAM, a CD-ROM, a magnetic tape, a floppy disc, an optical data storage device, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a non-transitory computer-readable medium, a computer-readable storage substrate, a random or serial access memory array or device, or a combination of one or more of them.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

In the present disclosure, it is to be understood that the terms "upper," "center," "lower," "front," "back," "vertical," "bottom," "inside," "outside," "axial," "radial," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" can include one or more of the features either explicitly or implicitly. In the description of the present disclosure, "a plurality" indicates two or more unless specifically defined otherwise.

In the present disclosure, the terms "connected," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," a second element may indicate that the first element is directly above the second element, or merely that the first element is at a level higher than the second element. The first element "below," the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific implementation," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A terminal, comprising:
   an image acquisition module comprising a lens;
   a display panel, wherein a light transmitting hole corresponding to the lens is formed inside the display panel; and
   a light-emitting element and a light converging member arranged at the light transmitting hole,
   wherein the light converging member is arranged at a light-emitting side of the light-emitting element, and is positioned and structured to first converge the light emitted by the light-emitting element over the lens, and then uniformly project the converged light onto an area of the display panel corresponding to the light-transmitting hole.

2. The terminal of claim 1, wherein the light converging member is disposed within the light transmitting hole, and is connected to a sidewall of the light transmitting hole; or
   the light converging member is disposed over the light-emitting element.

3. The terminal of claim 2, wherein the light-emitting element is disposed within the light transmitting hole, and is connected to a sidewall of the light transmitting hole; or
   the light-emitting element is disposed in an area around the light transmitting hole underneath the display panel; or
   the light-emitting element is movably disposed underneath the light transmitting hole and above the lens, and a moving range of the light-emitting element is from a field of view of the lens to an outside of the field of view of the lens.

4. The terminal of claim 2, wherein the light converging member is formed with a first hollow region corresponding to the lens.

5. The terminal of claim 4, wherein the light-emitting element is formed with a second hollow region corresponding to the first hollow region, and an overlapping portion of the first hollow region and the second hollow region is arranged corresponding to the lens.

6. The terminal of claim 1, wherein the light-emitting element is transparent.

7. The terminal of claim 1, wherein the light-emitting element comprises at least one of: a light-emitting array element, or an independent light-emitting device.

8. The terminal of claim 1, wherein the light-emitting element comprises a side light-emitting element having a distance from the lens greater than a first predetermined distance, and a field of view of the side light-emitting element is inclined toward a center of a field of view of the light-emitting element.

9. The terminal of claim 1, wherein the light transmitting hole comprises: a first through hole formed on a backlight layer of the display panel and a second through hole formed on a filter layer of the display panel and corresponding to the first through hole.

10. The terminal of claim 9, wherein
the display panel comprises an array substrate having a plurality of driving circuits; and
the plurality of driving circuits at the area of the display panel corresponding to the light transmitting hole have a density lower than a density at an area outside the light transmitting hole.

11. The terminal of claim 9, wherein the light transmitting hole further comprises a third through hole formed in the array substrate and a liquid crystal layer of the display panel, and the third through hole communicates with the first through hole and the second through hole.

12. The terminal of claim 9, further comprising: a light shading member arranged on a sidewall of the first through hole and used for shading a light emitted by the backlight layer.

13. A display panel, comprising:
a display screen formed with a light transmitting hole; and
a light-emitting element and a light converging member arranged at the light transmitting hole;
wherein the light converging member is located at a light-emitting side of the light-emitting element, and is positioned and structured to first converge the light emitted by the light-emitting element to a center of the light transmitting hole, and then uniformly project the converged light onto an area of the display panel corresponding to the light-transmitting hole.

14. The display panel of claim 13, wherein the light converging member is disposed in the light transmitting hole, and the light converging member is connected to a sidewall of the light transmitting hole; or
the light converging member overlies on the light-emitting element.

15. The display panel of claim 14, wherein the light-emitting element is disposed in the light transmitting hole, and is connected to a sidewall of the light transmitting hole; or
the light-emitting element is disposed in an area around the light transmitting hole under the display screen; or
the light-emitting element is movably disposed below the light transmitting hole, and a moving range of the light-emitting element is from the light transmitting hole to an outside of the light transmitting hole.

16. The display panel of claim 14, wherein the light converging member is formed with a first hollow region arranged corresponding to a lens in an image acquisition module; and the light-emitting element is formed with a second hollow region disposed corresponding to the first hollow region.

17. The display panel of claim 13, wherein the light-emitting element comprises a side light-emitting element having a distance to a sidewall of the light transmitting hole less than a second predetermined distance, and a field of view of the side light-emitting element is inclined toward a center of a field of view of the light-emitting element.

18. The display panel of claim 13, wherein the light transmitting hole comprises: a first through hole formed on a backlight layer, and a second through hole formed on a filter layer and corresponding to the first through hole; and a density of driving circuit of a portion of an array substrate corresponding to the light transmitting hole is lower than a density of driving circuit of a portion of the array substrate corresponding to an outside of the light transmitting hole.

19. A display control method for controlling a display panel of a terminal including
an image acquisition module having a lens:
a display panel, wherein a light transmitting hole corresponding to the lens is formed inside the display panel; and
a light-emitting element and a light converging member arranged at the light transmitting hole,
wherein the light converging member is arranged at a light-emitting side of the light-emitting element, and is positioned and structured to first converge the light emitted by the light-emitting element over the lens, and then uniformly project the converged light onto an area of the display panel corresponding to the light-transmitting hole;
the method comprising:
converging light from the light-emitting element emits light over the lens and uniformly projecting the converged light onto the area of the display panel corresponding to the light-transmitting hole, so as to realize a display operation including at least one of:
controlling the light-emitting element to display a preset image;
acquiring a display content corresponding to the light transmitting hole in a display interface of the display panel, and controlling the light-emitting element to emit light according to the display content; or
acquiring a display parameter of an image around the light transmitting hole in the display interface of the display panel, and controlling the light-emitting element to display the image according to the display parameter of the image around the light transmitting hole; the display parameter comprising at least one of: a brightness parameter, and a color parameter; and
the image acquisition module acquiring an image through the light transmitting hole to realize an image acquisition operation.

20. The method of claim 19, wherein the display panel is a liquid crystal display, the method further comprising, when the image acquisition module acquires an image, controlling liquid crystals in a liquid crystal layer of the liquid crystal display at a position corresponding to the light transmitting hole in the display panel to deflect and transmit light.

* * * * *